(12) United States Patent
Choi et al.

(10) Patent No.: US 9,857,640 B2
(45) Date of Patent: Jan. 2, 2018

(54) LIQUID CRYSTAL DISPLAY DEVICE

(71) Applicant: SAMSUNG DISPLAY CO., LTD., Yongin-si, Gyeonggi-do (KR)

(72) Inventors: Nakcho Choi, Hwaseong-si (KR); Injae Hwang, Suwon-si (KR); Hyunjoon Kim, Yongin-si (KR); Taekyung Yim, Seoul (KR); Joonggun Chong, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/132,309

(22) Filed: Apr. 19, 2016

(65) Prior Publication Data

US 2016/0370665 A1 Dec. 22, 2016

(30) Foreign Application Priority Data

Jun. 22, 2015 (KR) .................. 10-2015-0088404

(51) Int. Cl.
*G02F 1/1343* (2006.01)
*G02F 1/1337* (2006.01)

(52) U.S. Cl.
CPC .. *G02F 1/134309* (2013.01); *G02F 1/133707* (2013.01); *G02F 2001/134345* (2013.01)

(58) Field of Classification Search
CPC .............. G02F 1/1333; G02F 1/1335; G02F 1/133555; G02F 1/136; G02F 1/1368; G02F 1/136286; G02F 1/134309; G02F 1/133707; G02F 1/136227; G02F 1/133345; G02F 1/134336; G02F 1/134363; G02F 1/136213; G02F 1/133514; G02F 1/133512; G02F 1/136209; G02F 1/1362; G02F 1/1343; G02F 2201/123; G02F 2201/52; G02F 2001/136222; G02F 2001/13629; G02F 2001/134372; H01L 27/3244; H01L 27/326; G09G 2300/0426; G09G 2300/0439; G09G 3/3607; G09G 3/3677; G09G 3/3648
USPC ....... 349/43, 138, 143, 39, 38, 110, 139, 42, 349/106, 141, 114
See application file for complete search history.

(56) References Cited

U.S. PATENT DOCUMENTS

| | | | |
|---|---|---|---|
| 9,086,601 B2 | 7/2015 | Jeong et al. | |
| 9,158,169 B2 | 10/2015 | Shin et al. | |
| 2003/0086041 A1 | 5/2003 | Watanabe et al. | |
| 2004/0150759 A1* | 8/2004 | Nishino | ............ G02F 1/136213 349/38 |
| 2007/0064164 A1 | 3/2007 | Tasaka et al. | |

(Continued)

FOREIGN PATENT DOCUMENTS

| KR | 1020080077492 A | 8/2008 |
|---|---|---|
| KR | 1020120066339 A | 6/2012 |

(Continued)

*Primary Examiner* — Thoi Duong
(74) *Attorney, Agent, or Firm* — Cantor Colburn LLP

(57) ABSTRACT

A liquid crystal display device includes: a first substrate; a second substrate opposing the first substrate; and a plurality of pixels on the first substrate, a pixel of the plurality of pixels includes: a switching element connected to a gate line and a data line on the first substrate; a first pixel electrode connected to the switching element; and a second pixel electrode connected to the switching element and overlapping the first pixel electrode.

19 Claims, 20 Drawing Sheets

(56) References Cited

U.S. PATENT DOCUMENTS

| | | | |
|---|---|---|---|
| 2008/0123026 A1* | 5/2008 | Kwag | G02F 1/133555 |
| | | | 349/77 |
| 2012/0162559 A1 | 6/2012 | Kim et al. | |
| 2013/0057813 A1* | 3/2013 | Jeong | G02F 1/134309 |
| | | | 349/110 |
| 2014/0211142 A1 | 7/2014 | Kim et al. | |
| 2015/0116645 A1 | 4/2015 | Han et al. | |

FOREIGN PATENT DOCUMENTS

| KR | 1020120074967 A | 7/2012 |
|---|---|---|
| KR | 1020130027370 A | 3/2013 |
| KR | 1020140097905 A | 8/2014 |
| KR | 1020150048316 A | 5/2015 |

* cited by examiner

NA1 = NA2+NA3

NA1 > NA2+NA3

NA1 < NA2+NA3

LIQUID CRYSTAL DISPLAY DEVICE

This application claims priority to Korean Patent Application No. 10-2015-0088404, filed on Jun. 22, 2015, and all the benefits accruing therefrom under 35 U.S.C. §119, the content of which in its entirety is herein incorporated by reference.

BACKGROUND

1. Field

Embodiments of the invention relate to a liquid crystal display ("LCD") device capable of enhancing the visibility and aperture ratio thereof.

2. Description of the Related Art

A liquid crystal display ("LCD") device is one of the most widely used types of flat panel display ("FPD") device. An LCD device typically includes two substrates including electrodes formed thereon and a liquid crystal layer interposed between the two substrates. In such an LCD device, liquid crystal molecules of the liquid crystal layer are rearranged by voltages that are applied to the two electrodes, thereby adjusting the amount of transmitted light and displaying an image on the LCD device.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY

Aspects of embodiments of the invention are directed to a liquid crystal display ("LCD") device capable of enhancing the visibility and aperture ratio thereof.

According to an exemplary embodiment of the invention, a liquid crystal display device includes: a first substrate; a second substrate opposing the first substrate; and a plurality of pixels on the first substrate, where at least one pixel of the pixels includes: a switching element connected to a gate line and a data line on the first substrate; a first pixel electrode connected to the switching element; and a second pixel electrode connected to the switching element and overlapping the first pixel electrode.

In an exemplary embodiment, the at least one pixel may further include a third pixel electrode overlapping the first pixel electrode, and the third pixel electrode may be a floating electrode.

In an exemplary embodiment, each of the first, second and third pixel electrodes may include a transparent material.

In an exemplary embodiment, the at least one pixel includes first and second pixels, an overlapping area between the first pixel electrode and the third pixel electrode of the first pixel may differ from an overlapping area between a first pixel electrode and a third pixel electrode of the second pixel.

In an exemplary embodiment, the pixel and the another pixel may be connected to different data lines from one another.

In an exemplary embodiment, the pixel may be connected to an odd-numbered data line, and the another pixel may be connected to an even-numbered data line.

In an exemplary embodiment, the first pixel electrode may have a planar area, a ratio of which to a total planar area acquired by summing a planar area of the second pixel electrode and a planar area of the third pixel electrode is in a range of about ⅓ to about 1.

In an exemplary embodiment, the third pixel electrode and the second pixel electrode may be disposed in a same layer.

In an exemplary embodiment, the first pixel electrode may include: a linear electrode parallel to the data line; a first planar electrode at an end of the linear electrode; a second planar electrode at another end of the linear electrode; and a connection electrode extending from the second planar electrode to be connected to the switching element.

In an exemplary embodiment, the first planar electrode may be linearly symmetrical to the second planar electrode.

In an exemplary embodiment, at least one of the first planar electrode and the second planar electrode may be symmetrical to the linear electrode.

In an exemplary embodiment, the second pixel electrode may include: a stem electrode overlapping the linear electrode, the first planar electrode, and the second planar electrode; at least one branch electrode extending from the stem electrode; and a bridge electrode extending from the stem electrode to be connected to the connection electrode and to the switching element.

In an exemplary embodiment, the at least one branch electrode of the second pixel electrode may overlap at least one of the first planar electrode and the second planar electrode.

In an exemplary embodiment, the third pixel electrode may include: a first floating electrode overlapping the first planar electrode; a second floating electrode overlapping a portion of the second planar electrode; and a third floating electrode overlapping another portion of the second planar electrode.

In an exemplary embodiment, a portion of the first floating electrode may not overlap the first planar electrode.

In an exemplary embodiment, a portion of at least one of the second floating electrode and the third floating electrode may not overlap the second planar electrode.

In an exemplary embodiment, the first floating electrode may include: a stem electrode; a first branch electrode extending from the stem electrode and overlapping a portion of the first planar electrode; and a second branch electrode extending from the stem electrode and overlapping another portion of the first planar electrode.

In an exemplary embodiment, the second floating electrode may include: a stem electrode; and a branch electrode extending from the stem electrode and overlapping the portion of the second planar electrode.

In an exemplary embodiment, the third floating electrode may include: a stem electrode; and a branch electrode extending from the stem electrode and overlapping the another portion of the second planar electrode.

In an exemplary embodiment, the third pixel electrode may include: a first floating electrode overlapping a portion of the first planar electrode and a portion of the second planar electrode; and a second floating electrode overlapping another portion of the first planar electrode and another portion of the second planar electrode.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other features and aspects of the disclosure of invention will be more clearly understood from the following detailed description taken in conjunction with the accompanying drawings, in which.

DETAILED DESCRIPTION

Figure 1:
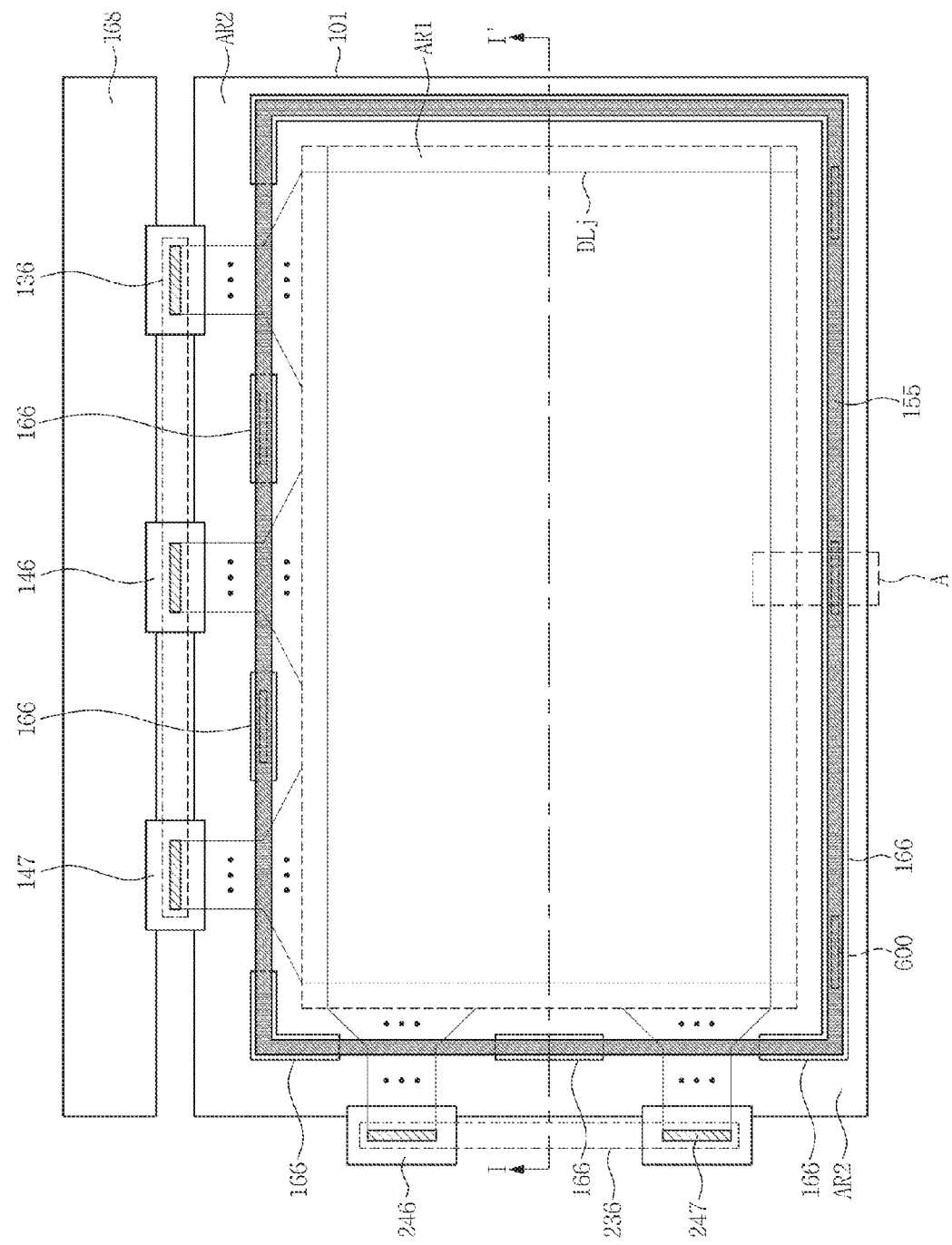
FIG. 1 is a view illustrating a first panel and a peripheral circuit connected to the first panel of a liquid crystal display ("LCD") device according to an exemplary embodiment.

Advantages and features of the invention and methods for achieving them will be made clear from exemplary embodiments described below in detail with reference to the accompanying drawings. The invention may, however, be embodied in many different forms and should not be construed as being limited to the exemplary embodiments set forth herein. Rather, these exemplary embodiments are provided so that this disclosure will be thorough and complete, and will fully convey the scope of the invention to those skilled in the art. The invention is merely defined by the scope of the claims. Therefore, well-known constituent elements, operations and techniques are not described in detail in the exemplary embodiments in order to prevent the invention from being obscurely interpreted. Like reference numerals refer to like elements throughout the specification.

In the drawings, thicknesses of a plurality of layers and areas are illustrated in an enlarged manner for clarity and ease of description thereof. When a layer, area, or plate is referred to as being "on" another layer, area, or plate, it may be directly on the other layer, area, or plate, or intervening layers, areas, or plates may be therebetween. Conversely, when a layer, area, or plate is referred to as being "directly on" another layer, area, or plate, intervening layers, areas, or plates may be absent therebetween. Further when a layer, area, or plate is referred to as being "below" another layer, area, or plate, it may be directly below the other layer, area, or plate, or intervening layers, areas, or plates may be therebetween. Conversely, when a layer, area, or plate is referred to as being "directly below" another layer, area, or plate, intervening layers, areas, or plates may be absent therebetween.

The spatially relative terms "below", "beneath", "lower", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined herein.

Figure 2:
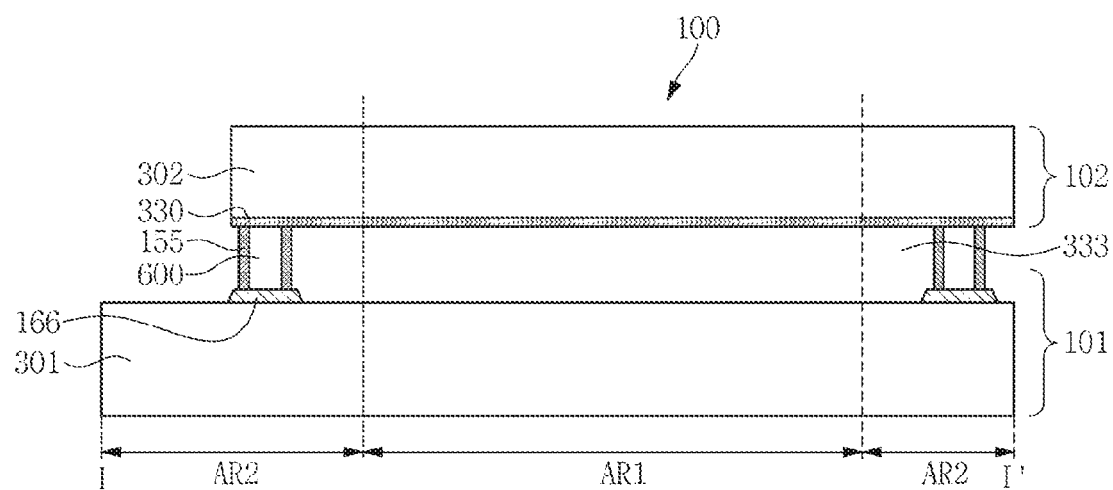
FIG. 2 is a cross-sectional view taken along line I-I' of FIG. 1.
Figure 3:
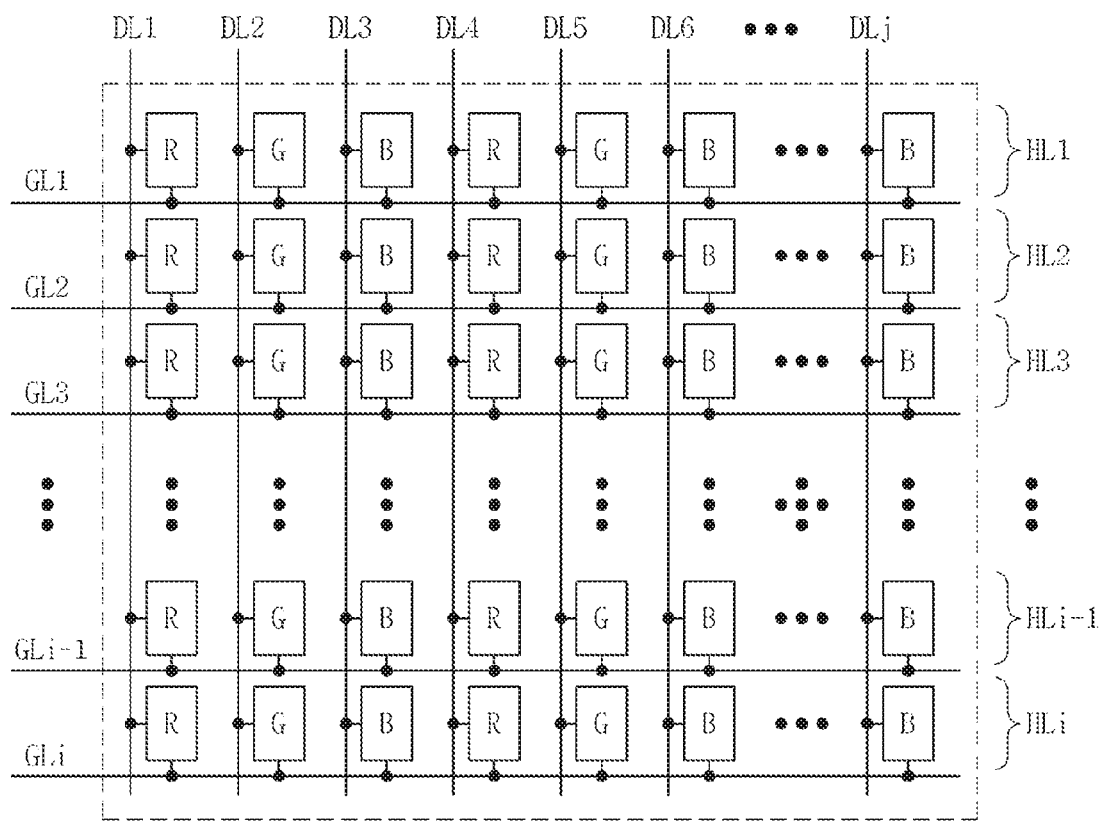
FIG. 3 is a schematic view illustrating pixels of a display panel of FIG. 2.

FIG. 1 is a view illustrating a first panel 101 and a peripheral circuit connected to the first panel 101 of a liquid crystal display ("LCD") device according to an exemplary embodiment. FIG. 2 is a cross-sectional view taken along line I-I' of FIG. 1. FIG. 3 is a schematic view illustrating pixels of a display panel 100 of FIG. 2.

An exemplary embodiment of a LCD device, as illustrated in FIGS. 1 and 2, includes the display panel 100, a gate driver 236, a data driver 136 and a circuit board 168.

A display area AR1 of the display panel 100 corresponds to a display area AR1 of the first panel 101 and a display area AR1 of a second panel 102. A non-display area AR2 of the display panel 100 corresponds to a non-display area AR2 of the first panel 101 and a non-display area AR2 of the second panel 102.

A sealing portion 155 is disposed between the first panel 101 and the second panel 102. In an exemplary embodiment, the sealing portion 155, as illustrated in FIG. 2, is disposed between the non-display area AR2 of the first panel 101 and the non-display area AR2 of the second panel 102. The sealing portion 155, for example, as illustrated in FIG. 1, may have a closed line shape surrounding the display area AR1.

A liquid crystal layer 333 is disposed between the first panel 101 and the second panel 102. In an exemplary embodiment, the liquid crystal layer 33 is positioned in a space defined by the first panel 101, the second panel 102 and the sealing portion 155. The liquid crystal layer 333 may have a negative dielectric anisotropy and may include vertically aligned liquid crystal molecules. In an alternative exemplary embodiment, the liquid crystal layer 333 may include a photopolymerization material, and such a photopolymerization material may be a reactive monomer or a reactive mesogen.

In an exemplary embodiment, as illustrated in FIG. 2, the first panel 101 may have a planar area greater than a planar area of the second panel 102. The first panel 101 and the second panel 102 face one another while having the liquid crystal layer 333 therebetween.

In an exemplary embodiment, the first panel 101, as illustrated in FIG. 1, includes a first substrate 301, a plurality of gate lines GL1 to GLi, a plurality of data lines DL1 to DLj, and a common line 166. The gate lines GL1 to GLi, the data lines DL1 to DLj, and the common line 166 are disposed on the first substrate 301.

The data lines DL1 to DLj intersect the gate lines GL1 to GLi. The gate lines GL1 to GLi extend onto the non-display area AR2 to be connected to the gate driver 236. The data lines DL1 to DLj extend onto the non-display area AR2 to be connected to the data driver 136.

The gate driver 236 may include a plurality of gate driving integrated circuits 247. The gate driving integrated circuits 247 generate gate signals and sequentially provide the gate signals to the first to i-th gate lines GL1 to GLi, respectively.

The gate driving integrated circuits 247 are disposed or mounted on gate carriers 246, respectively. The gate carriers 246 are electrically connected to the first panel 101. In one exemplary embodiment, for example, the gate carriers 246 are electrically connected between the circuit board 168 and a non-display area AR2 of the first substrate 301.

The data driver 136 may include a plurality of data driving integrated circuits 147. The data driving integrated circuits 147 receive digital image data signals and a data control signal from a timing controller (not shown). The data driving integrated circuits 147 may perform sampling of the digital image data signals based on the data control signal, perform latching of the sampled digital image data signals corresponding to a single horizontal line for each horizontal period, and provide the latched digital image data signals to the data lines DL1 to DLj, respectively. In an exemplary embodiment, the data driving integrated circuits 147 convert the digital image data signals provided from the timing controller into analog image data signals using gamma voltages that are input from a power supply (not illustrated), and provide the analog image data signals to the data lines DL1 to DLj, respectively.

The data driving integrated circuits 147 are disposed or mounted on data carriers 146, respectively. The data carriers 146 are connected between the circuit board 168 and the first panel 101. In one exemplary embodiment, for example, the data carriers 146 are electrically connected between the circuit board 168 and the non-display area AR2 of the first substrate 301.

In an exemplary embodiment, where the aforementioned timing controller and the power supply are disposed on the circuit board 168, the data carrier 146 includes input wirings for transmitting various signals from the timing controller and the power supply to a predetermined data driving integrated circuit 147 and output wirings for transmitting image data signals output from the data driving integrated circuit 147 to corresponding data lines. In such an embodiment, at least one of the data carriers 146 may further include auxiliary wirings for transmitting various signals from the timing controller and the power supply to the gate driver 236. The auxiliary wirings are connected to panel wirings on the first panel 101. The panel wirings connect the auxiliary wirings and the gate driver 236 to one another. The panel wirings may be provided or formed in the non-display area AR2 of the first substrate 301 in a line-on-glass manner.

The common line 166 is disposed between the sealing portion 155 and the first substrate 301. The common line 166 is disposed along the sealing portion 155. In such an embodiment, the common line 166, as illustrated in FIG. 1, may not overlap an intersection area between the sealing portion 155 and the gate lines GL1 to GLi. In such an embodiment, the common line 166, as illustrated in FIG. 1, may not overlap an intersection area between the sealing portion 155 and the data lines DL1 to DLj.

The common line 166 receives a common voltage from the aforementioned power supply. In an exemplary embodiment, the common line 166 may be connected to the power supply via a line on the gate carrier 246 and a line on the data carrier 146.

The second panel 102 includes a second substrate 302 and a common electrode 330 on the second substrate 302.

The common electrode 330 of the second panel 102 is connected to the common line 166 of the first panel 101 via a short-circuit portion 600. The common electrode 330 receives a common voltage from the common line 166 via the short-circuit portion 600.

The display panel 100, as illustrated in FIG. 3, includes a plurality of pixels R, G and B. The pixels R, G and B, as illustrated in FIG. 3, are positioned in the display area AR1 of the display panel 100.

The pixels R, G and B are arranged substantially in a matrix form. The pixels R, G and B are categorized into red pixels R that display a red image, green pixels G that display a green image, and blue pixels B that display a blue image. In such an embodiment, horizontally adjacent red, green and blue pixels R, G and B may define a unit pixel for displaying a unit color image.

In an exemplary embodiment, j pixels (j being a natural number) may be arranged along an n-th horizontal line (n being one of 1 to i), and the j pixels are also referred to as "n-th horizontal line pixels" and may be individually connected to the first to j-th data lines DL1 to DLj, respectively. In such an embodiment, the n-th horizontal line pixels are connected to a common n-th gate line, such that the n-th horizontal line pixels receive a common n-th gate signal. In such an embodiment, all of the j pixels arranged along the same horizontal line receive the same gate signals, while other pixels disposed on different horizontal lines receive different gate signals from one another. In one exemplary embodiment, for example, a red pixel R and a green pixel G disposed on a first horizontal line HL1 all receive a first gate signal, and a red pixel R and a green pixel G disposed on a second horizontal line HL2 all receive a second gate signal having a different timing from that of the first gate signal.

Figure 4:
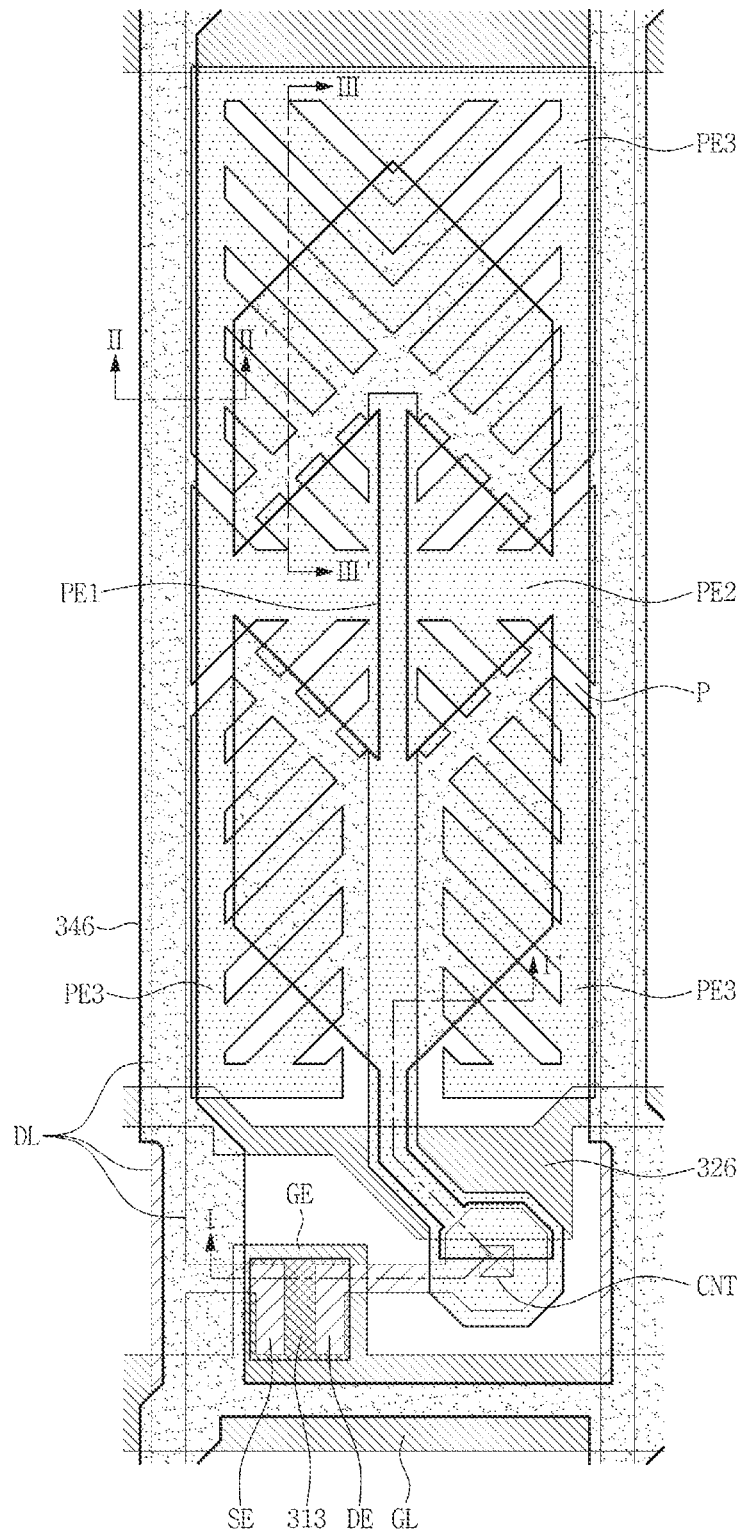
FIG. 4 is a plan view illustrating an exemplary embodiment of a pixel illustrated in FIG. 3.
Figure 5:
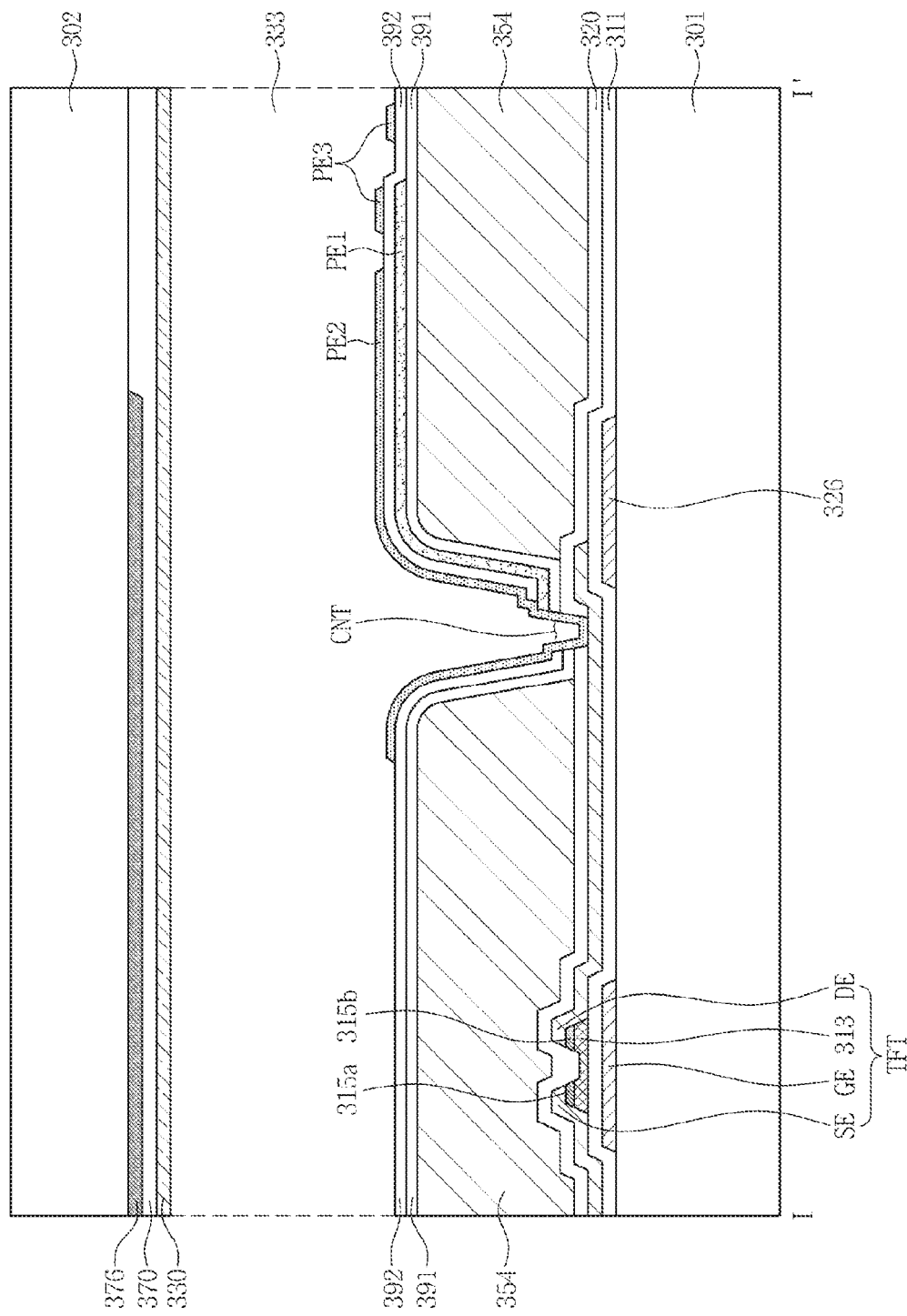
FIG. 5 is a cross-sectional view taken along line I-I' of FIG. 4.
Figure 6:
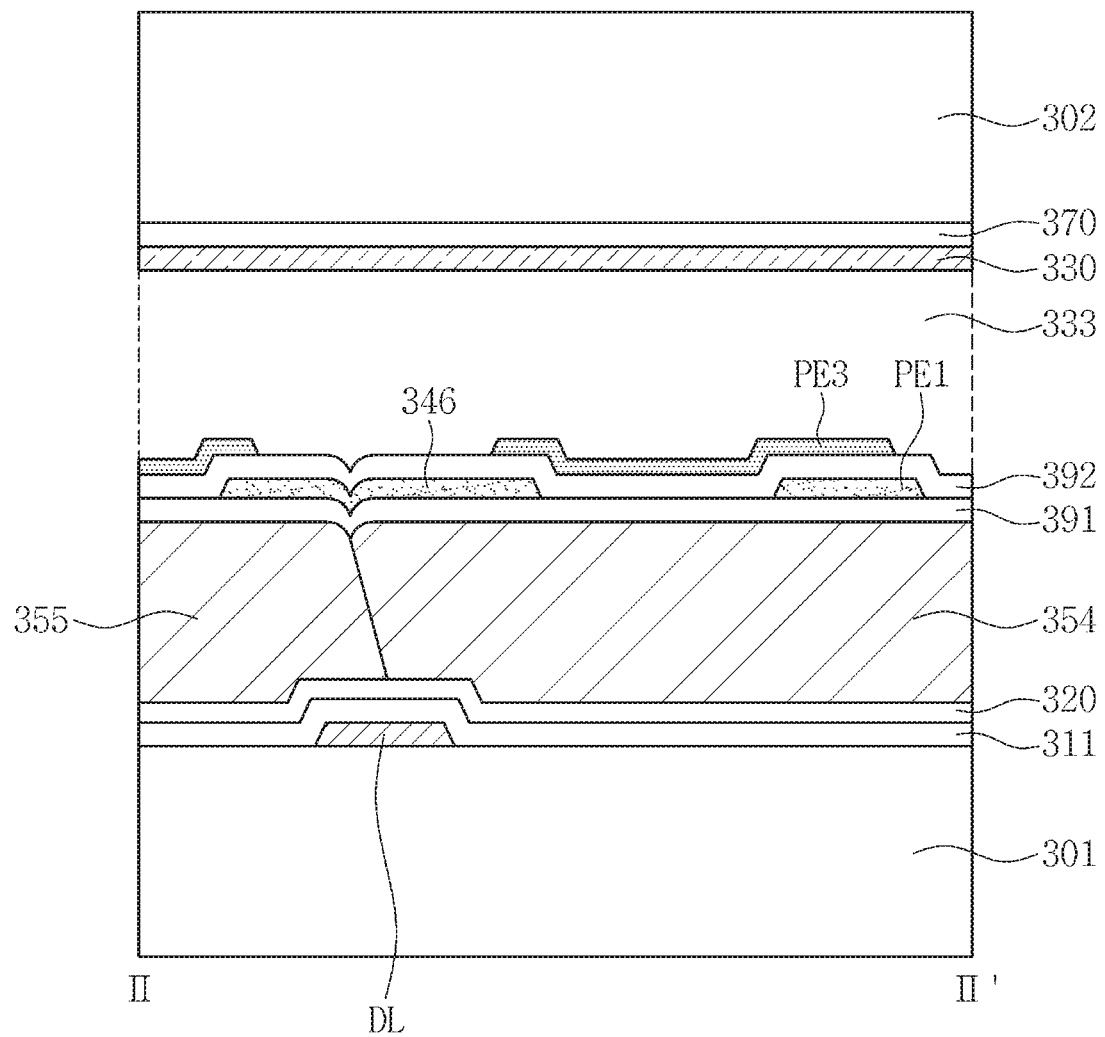
FIG. 6 is a cross-sectional view taken along line II-IP of FIG. 4.

FIG. 4 is a plan view illustrating an exemplary embodiment of a pixel illustrated in FIG. 3. FIG. 5 is a cross-sectional view taken along line I-I' of FIG. 4. FIG. 6 is a cross-sectional view taken along line II-II' of FIG. 4.

In an exemplary embodiment, a pixel, as illustrated in FIGS. 4, 5 and 6, includes a thin film transistor TFT, a storage electrode 326, a color filter 354, a first pixel electrode PE1, a second pixel electrode PE2, a third pixel electrode PE3, a light shielding layer 376, an overcoat layer 370, the common electrode 330, and the liquid crystal layer 333. In such an embodiment, the thin film transistor TFT, as illustrated in FIGS. 4 and 5, includes a gate electrode GE, a semiconductor layer 313, a source electrode SE, and a drain electrode DE. Alternatively, the pixel may not include the overcoat layer 370.

Although not illustrated, the pixel may further include a first polarizer and a second polarizer. When surfaces of the first substrate 301 and the second substrate 302 that face one another, e.g., inner surfaces, are defined as upper surfaces of the corresponding substrates, respectively, and surfaces of the first substrate 301 and the second substrate 302 opposite to the upper surfaces thereof, e.g., outer surfaces, are defined as lower surfaces of the corresponding substrates, respectively, the first polarizer may be disposed on the lower surface of the first substrate 301, and the second polarizer may be disposed on the lower surface of the second substrate 302.

A transmissive axis of the first polarizer is substantially perpendicular to a transmissive axis of the second polarizer, and one of the transmissive axes is disposed in parallel to the gate line GL. Alternatively, the LCD device may include only one of the first polarizer and the second polarizer.

The first substrate 301 may be an insulating substrate including or formed of glass or plastic.

The gate electrode GE, the gate line GL, and the storage electrode 326 are disposed on the first substrate 301.

The gate electrode GE and the gate line GL may be integrally formed as a single unitary and indivisible unit. The gate electrode GE, as illustrated in FIG. 4, may be defined by a protruding portion of the gate line GL toward the storage electrode 326.

The gate line GL may have a connection portion, for example, an end portion thereof, which is wider than another portion thereof in size, to be connected to another layer or an external driving circuit.

The first storage electrode 326 overlaps at least one of the first pixel electrode PE1, the second pixel electrode PE2 and the third pixel electrode PE3. A storage capacitor is formed between the storage electrode 326 and the pixel electrode overlapping one another.

At least one of the gate electrode GE, the gate line GL, and the storage electrode 326 may include at least one metal selected from an aluminum (Al)-based metal such as Al or an Al alloy thereof, a silver (Ag)-based metal such as Ag or a Ag alloy thereof, a copper (Cu)-based metal such as Cu or a Cu alloy thereof, and/or a molybdenum (Mo)-based metal such as Mo or a Mo alloy thereof. In an alternative exemplary embodiment, at least one of the gate line GL and the gate electrode GE may include at least one selected from chromium (Cr), tantalum (Ta), and titanium (Ti). In an exemplary embodiment, the gate electrode GE, the gate line GL, and the storage electrode 326 may have a multilayer structure including at least two conductive layers having different physical properties from one another.

The gate insulating layer 311, as illustrated in FIG. 5, is disposed on the gate electrode GE, the gate line GL and the storage electrode 326. In such an embodiment, the gate insulating layer 311 may be disposed over an entire surface of the first substrate 301 including the gate electrode GE, the gate line GL and the first storage electrode 326. The gate insulating layer 311 may include or be formed of, for example, silicon nitride ($SiN_x$), silicon oxide ($SiO_x$), or the like. The gate insulating layer 311 may have a multilayer structure including at least two insulating layers having different physical properties from one another.

The semiconductor layer 313 is disposed on the gate insulating layer 311. In such an embodiment, the semiconductor layer 313 overlaps at least a portion of the gate electrode GE. The semiconductor layer 313 may include or be formed of amorphous silicon, polycrystalline silicon, or the like.

First and second ohmic contact layers 315a and 315b, as illustrated in FIG. 5, are disposed on the semiconductor layer 313. The first and second ohmic contact layers 315a and 315b face one another while having a channel of the semiconductor layer 313 therebetween. At least one of the first and second ohmic contact layers 315a and 315b may include silicide, or n+ hydrogenated amorphous silicon doped with n-type impurities, such as phosphorus, at high concentration.

The source electrode SE is disposed on the first ohmic contact layer 315a and the gate insulating layer 311. The source electrode SE and the data line DL may be integrally formed as a single unitary and indivisible unit. At least a portion of the source electrode SE overlaps the semiconductor layer 313 and the gate electrode GE. The source electrode SE may have one of an I-like shape, a C-like shape, and a U-like shape.

The drain electrode DE is disposed on the second ohmic contact layer 315b and the gate insulating layer 311. At least a portion of the drain electrode DE overlaps the semiconductor layer 313 and the gate electrode GE. The drain electrode DE is connected to the second pixel electrode PE2.

The data line DL is disposed on the gate insulating layer 311. The data line DL may have a connection portion, for example, an end portion thereof, which is wider than another portion thereof in size, to be connected to another layer or an external driving circuit. Although not illustrated, a center portion of the data line DL may be bent to have a V-like shape to significantly increase the transmittance of the LCD device. Although not illustrated, the semiconductor layer and the ohmic contact layer may further be disposed between the data line DL and the gate insulating layer 311.

At least one of the source electrode SE, the drain electrode DE and the data line DL may include or be formed of a refractory metal such as molybdenum (Mo), chromium (Cr), tantalum (Ta) and titanium (Ti) or an alloy thereof. At least one of the data line DL, the source electrode SE and the drain electrode DE may have a multilayer structure including a refractory metal layer and a low-resistance conductive layer. In one exemplary embodiment, for example, such a multilayer structure may include: a double-layer structure including a Cr or Mo (alloy) lower layer and an Al (alloy) upper layer; or a triple-layer structure including a Mo (alloy) lower layer, an Al (alloy) intermediate layer, and a Mo (alloy) upper layer. In an exemplary embodiment, at least one of the source electrode SE, the drain electrode DE and the data line DL may include or be formed of various metals or conductive materials, in addition to, or instead of, the aforementioned materials.

A passivation layer 320, as illustrated in FIG. 5, is disposed on the gate insulating layer 311, the source electrode SE, the drain electrode DE and the data line DL. In such an embodiment, the passivation layer 320 may be disposed over an entire surface of the first substrate 301 which includes the gate insulating layer 311, the source electrode SE, the drain electrode DE and the data line DL. The passivation layer 320 may include or be formed of an inorganic insulating material such as $SiN_X$ or $SiO_X$. In an exemplary embodiment where the passivation layer 320 includes or is formed of such an inorganic insulating material, the inorganic insulating material may have photosensitivity and a dielectric constant of about 4.0. In such an embodiment, the passivation layer 320 may have a double-layer structure including a lower inorganic layer and an upper organic layer. The double-layer structure of the passivation layer 320 may have a high insulating property, and may substantially reduce or effectively prevent damage to an exposed portion of the semiconductor layer 313. The passivation layer 320 may have a thickness of greater than or equal to about 5000 angstroms (Å), for example, in a range of about 6000 Å to about 8000 Å.

A drain contact hole CNT is defined through the passivation layer 320, a first insulating interlayer 391 and a second insulating interlayer 392. A portion of the drain electrode DE is exposed through the drain contact hole CNT.

The color filter 354, as illustrated in FIG. 5, is disposed on the passivation layer 320. An edge of the color filter 354 is disposed on the gate line GL, the thin film transistor TFT and the data line DL. In an exemplary embodiment, the color filter 354 may not overlap a connecting portion between the drain electrode DE and the second pixel electrode PE2. In such an embodiment, the color filter 354 is absent on the passivation layer 320 corresponding to the drain contact hole CNT through which the connecting portion is exposed. In an exemplary embodiment, the edge of the color filter 354 may overlap an edge of an adjacent color filter 354 thereof. The color filter 354 may include or be formed of a photosensitive organic material.

The first insulating interlayer 391, as illustrated in FIG. 5, is disposed on the passivation layer 320 and the color filter 354. In such an embodiment, the first insulating interlayer 391 may be disposed over an entire surface of the first substrate 301 which includes the passivation layer 320 and the color filter 354. The first insulating interlayer 391 may effectively prevent the diffusion of impurities generated from the color filter 354. The first insulating interlayer 391 may include or be formed of $SiN_X$ or $SiO_X$. The drain contact hole CNT, through which the drain electrode DE is exposed, is defined through the first insulating interlayer 391.

The first pixel electrode PE1 is disposed on the first insulating interlayer 391. The first pixel electrode PE1 is connected to the drain electrode DE through the second pixel electrode PE2. The first pixel electrode PE1 may include or be formed of a transparent conductive material such as indium-tin oxide ("ITO") or indium-zinc oxide ("IZO"). In such an embodiment, ITO may be a polycrystalline or monocrystalline material, and IZO may also be a polycrystalline or monocrystalline material.

Hereinafter, the first pixel electrode PE1 will be described in greater detail with reference to FIGS. 4 and 7.

Figure 7:
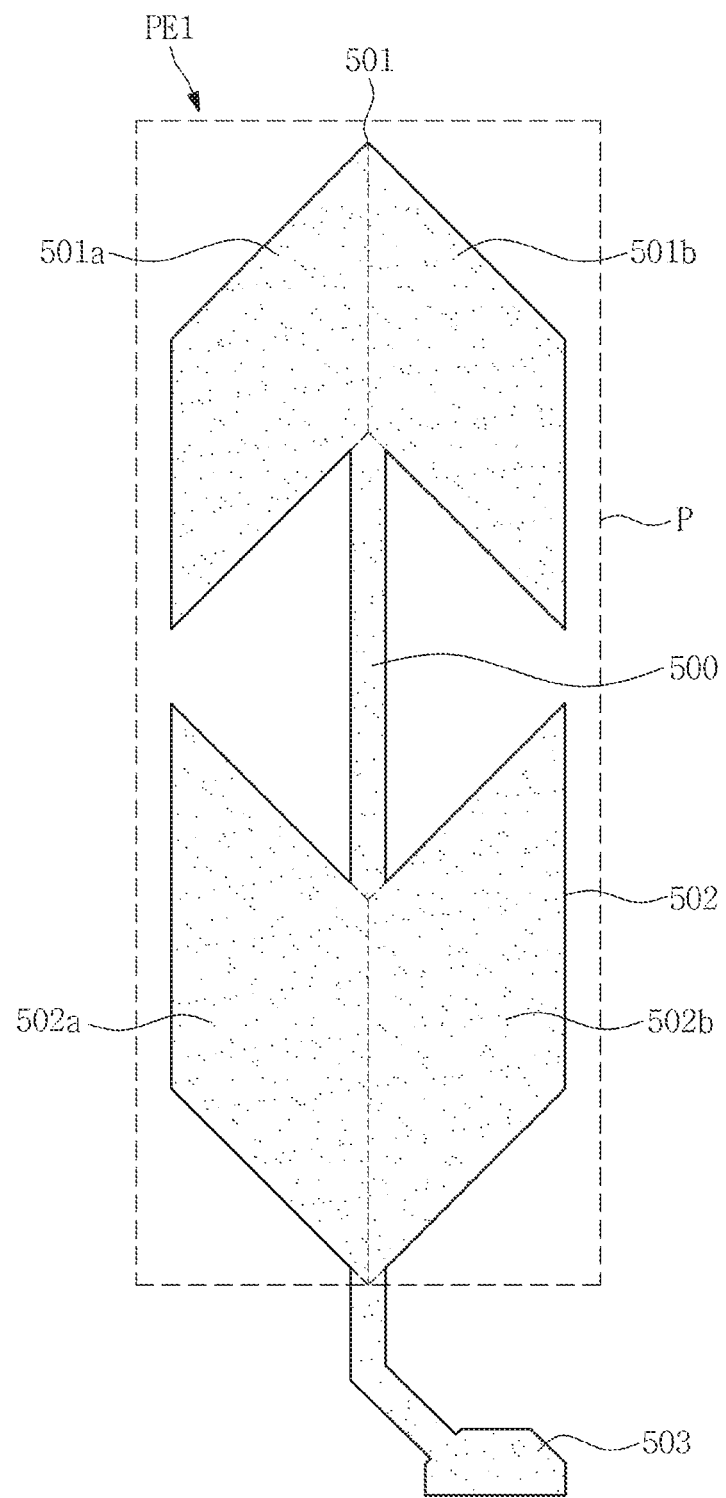
FIG. 7 is a view illustrating a first pixel electrode of FIG. 4.

FIG. 7 is a view illustrating the first pixel electrode PE1 of FIG. 4.

In an exemplary embodiment, the first pixel electrode PE1, as illustrated in FIG. 7, includes a linear electrode 500, a first planar electrode 501, a second planar electrode 502, and a connection electrode 503. In such an embodiment, the linear electrode 500, the first planar electrode 501 and the second planar electrode 502 are disposed in a pixel region P.

The linear electrode 500 is aligned in parallel to the data line DL.

The first planar electrode 501 is disposed at an end of the linear electrode 500. The first planar electrode 501, as illustrated in FIG. 7, includes a first electrode 501a and a second electrode 501b. The first planar electrode 501 may have a symmetrical shape. The first electrode 501a and the second electrode 501b of the first planar electrode 501 are symmetrical to one another with respect to the linear electrode 500. In one exemplary embodiment, for example, as illustrated in FIG. 7, each of the first electrode 501a and the second electrode 501b may have a parallelogram shape, such that the second electrode 501b may have a shape symmetrical to that of the first electrode 501a with respect to the linear electrode 500.

The second planar electrode 502 is disposed at another end of the linear electrode 500. The second planar electrode 502, as illustrated in FIG. 7, includes a first electrode 502a and a second electrode 502b. The second planar electrode 502 may have a symmetrical shape. The first electrode 502a and the second electrode 502b are symmetrical to one another with respect to the linear electrode 500. In one exemplary embodiment, for example, as illustrated in FIG. 7, each of the first electrode 502a and the second electrode 502b of the second planar electrode 502 may have a parallelogram shape, such that the second electrode 502b may have a shape symmetrical to that of the first electrode 502a with respect to on the linear electrode 500.

In such an embodiment, the first planar electrode 501 and the second planar electrode 502 are symmetrical to one another with respect to a horizontal imaginary line extending in a direction perpendicular to the linear electrode 500 and intersecting a center portion of the linear electrode 500. In such an embodiment, the first electrode 501a of the first planar electrode 501 has substantially the same shape as that of the second electrode 502b of the second planar electrode 502, and the second electrode 501b of the first planar electrode 501 has substantially the same shape as that of the first electrode 502a of the second planar electrode 502.

The connection electrode 503 extends from the second planar electrode 502 to be connected to the drain electrode DE of the thin film transistor TFT. The connection electrode 503 may be connected directly to the drain electrode DE. In an alternative exemplary embodiment, the connection electrode 503, as illustrated in FIG. 5, may be connected indirectly to the drain electrode DE through the second pixel electrode PE2.

In an exemplary embodiment, as illustrated in FIGS. 4 and 6, a shielding layer 346 may further be disposed on the first insulating interlayer 391. The shielding layer 346 and the first pixel electrode PE1 may include or be formed of the same material as each other. The shielding layer 346 and the first pixel electrode PE1 are disposed in or on the same layer. The shielding layer 346 and the first pixel electrode PE1 may be simultaneously formed or provided via a same process.

The shielding layer 346 overlaps the gate line GL, the data line DL and the source electrode SE. The shielding layer 346 receives the common voltage. The shielding layer 346 effectively prevents an electric field from being generated between the data line DL and the first, second and third pixel electrodes PE1, PE2 and PE3. In such an embodiment, since an equipotential is formed between the shielding layer 346 and the common electrode 330, light transmitted through the liquid crystal layer 333 between the shielding layer 346 and the common electrode 330 is blocked by the second polarizer. Accordingly, light leakage in an area corresponding to the data line DL is reduced or effectively prevented.

The second insulating interlayer 392 is disposed on the first pixel electrode PE1, the shielding layer 346 and the first insulating interlayer 391. In such an embodiment, the second insulating interlayer 392 may be disposed over an entire surface of the first substrate 301 which includes the first pixel electrode PE1, the shielding layer 346, and the first insulating interlayer 391. The second insulating interlayer 392 and the first insulating interlayer 391 may include or be formed the same material. The drain contact hole CNT, through which the drain electrode DE is exposed, is defined through the second insulating interlayer 392.

The second pixel electrode PE2 and the third pixel electrode PE3 are disposed on the second insulating interlayer 392.

The second pixel electrode PE2 is connected to the drain electrode DE and the first pixel electrode PE1 through the drain contact hole CNT. The second pixel electrode PE2 and the first pixel electrode PE1 may include or be formed of the same material.

The third pixel electrode PE3 is a floating electrode. In one exemplary embodiment, for example, the third pixel electrode PE3 may not be physically connected to any electrode. The third pixel electrode PE3 and the first pixel electrode PE1 may include or be formed of the same material as each other.

Hereinafter, the second pixel electrode PE2 and the third pixel electrode PE3 will be described in greater detail with reference to FIGS. 4 and 8.

Figure 8:
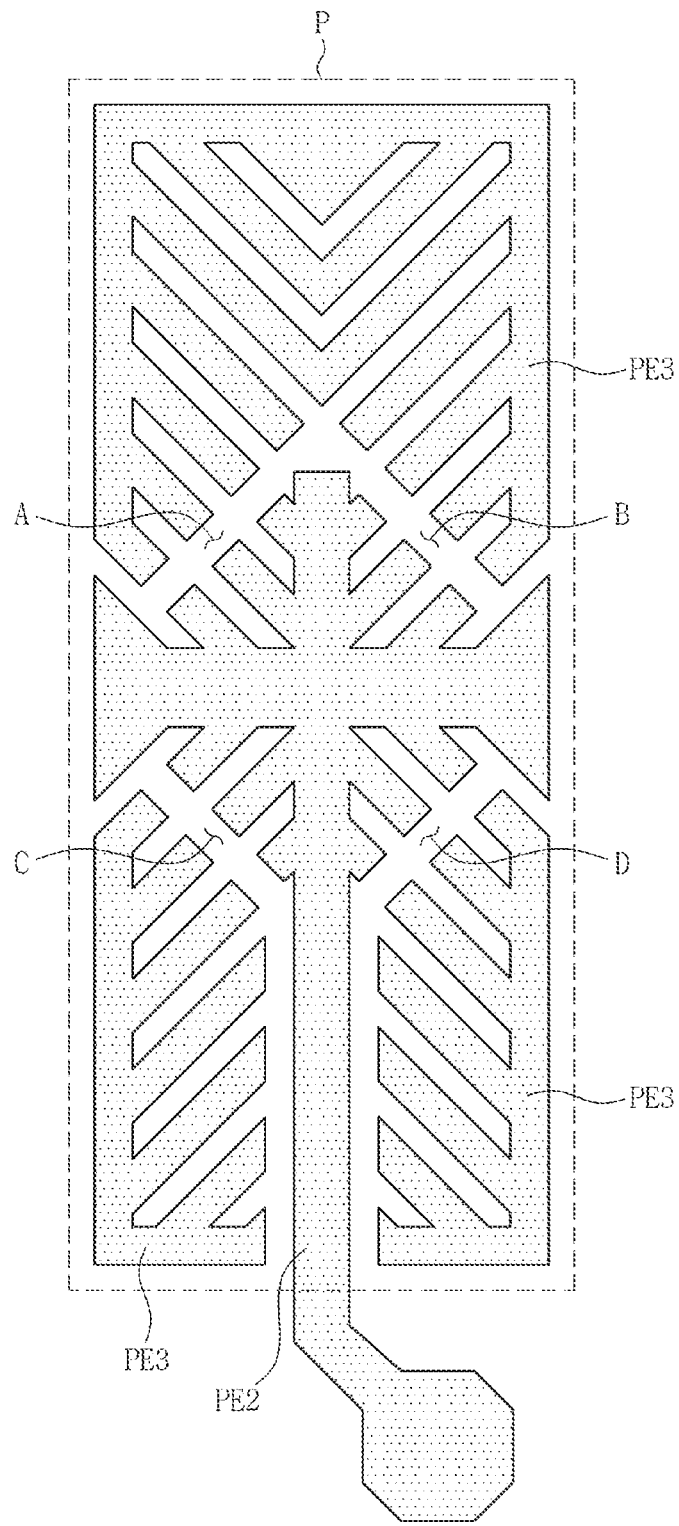
FIG. 8 is a view illustrating a structure of a second pixel electrode and a third pixel electrode of FIG. 4.
Figure 9:
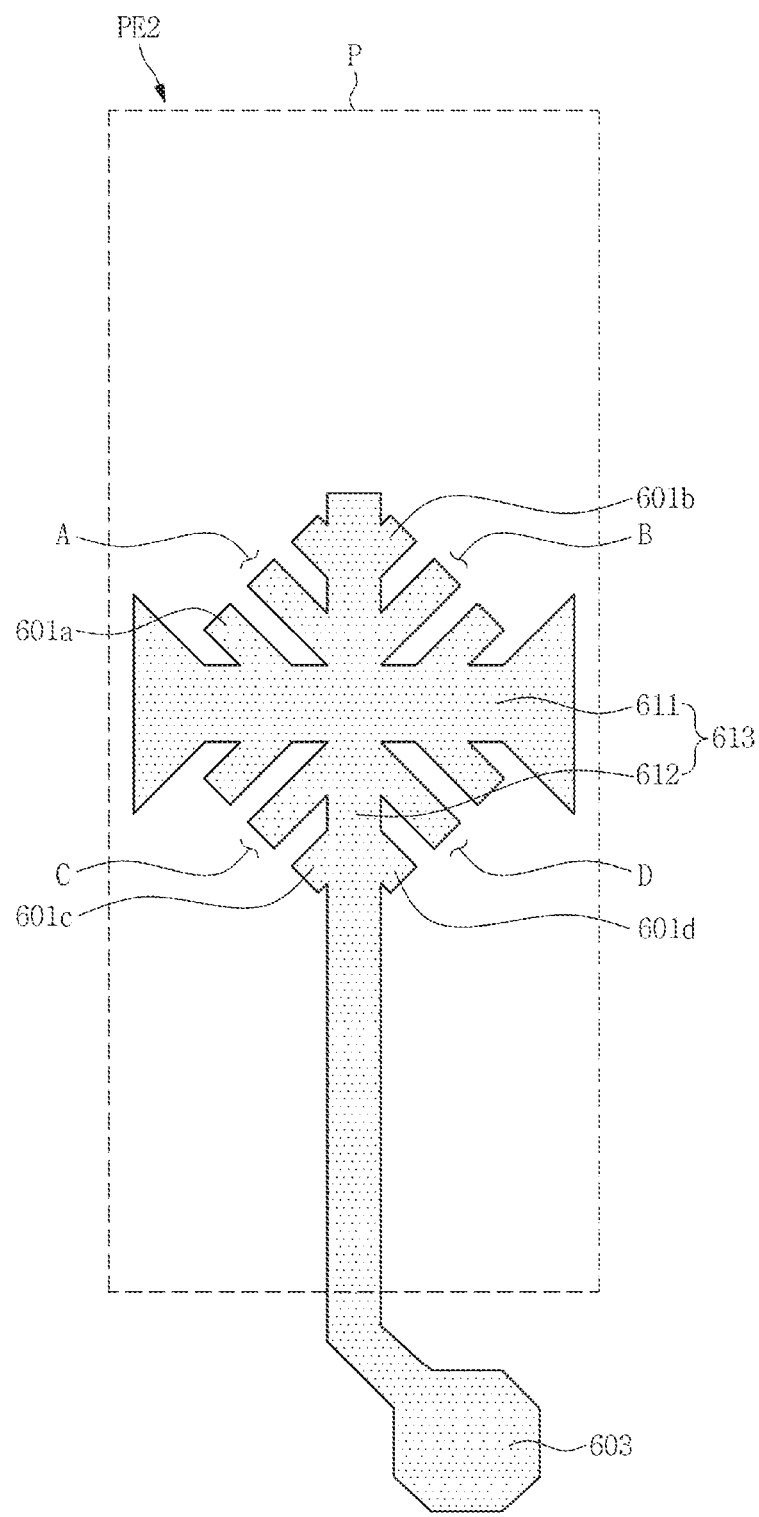
FIG. 9 is a view illustrating a second pixel electrode of FIG. 8.
Figure 10:
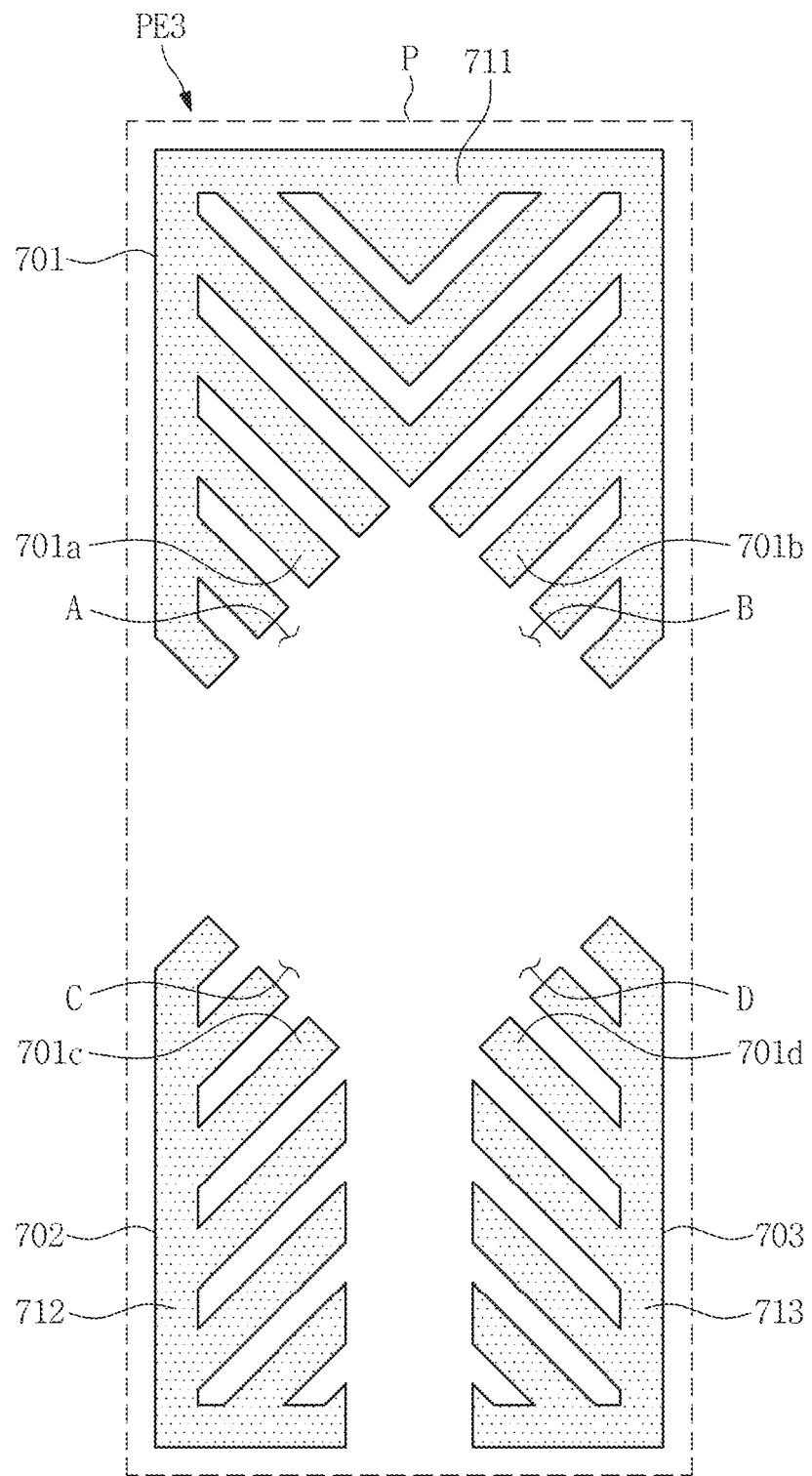
FIG. 10 is a view illustrating a third pixel electrode of FIG. 8.

FIG. 8 is a view illustrating a structure of the second pixel electrode PE2 and the third pixel electrode PE3 of FIG. 4. FIG. 9 is a view illustrating the second pixel electrode PE2 of FIG. 8. FIG. 10 is a view illustrating the third pixel electrode PE3 of FIG. 8.

The second pixel electrode PE2, as illustrated in FIGS. 8 and 9, includes a stem electrode 613, branch electrodes 601a, 601b, 601c and 601d, and a bridge electrode 603.

The stem electrode 613 divides the pixel region P into a plurality of domains. In one exemplary embodiment, for example, the stem electrode 613 may have a cross shape and include a horizontal electrode 611 and a vertical electrode 612 intersecting one another. The horizontal electrode 611 and the vertical electrode 612 divide the pixel region P into four domains A, B, C and D.

The branch electrodes 601a, 601b, 601c and 601d include first, second, third and fourth branch electrodes 601a, 601b, 601c and 601d extending from the stem electrode 613 into different directions from one another. In such an embodiment, the first, second, third and fourth branch electrodes 601a, 601b, 601c and 601d extend from the stem electrode 613 onto the domains A, B, C and D, respectively. In one exemplary embodiment, for example, the first branch electrode 601a extends onto a first domain A, the second branch electrode 601b extends onto a second domain B, the third branch electrode 601c extends onto a third domain C, and the fourth branch electrode 601d extends onto a fourth domain D.

The first branch electrode 601a may include a plurality of branch electrodes in the first domain A, and the plurality of first branch electrodes 601a are aligned in parallel to one another. In such an embodiment, at least one of the first branch electrodes 601a extends from one side of the horizontal electrode 611 in the first domain A diagonally with respect to the one side of the horizontal electrode 611. The remainder of the first branch electrodes 601a extends from one side of the vertical electrode 612 in the first domain A diagonally with respect to the one side of the vertical electrode 612.

The second branch electrode 602 may include a plurality of branch electrodes in the second domain B, and the plurality of second branch electrodes 602 are aligned in parallel to one another. In such an embodiment, at least one of the second branch electrodes 602 extends from one side of the horizontal electrode 611 in the second domain B diagonally with respect to the one side of the horizontal electrode 611. The remainder of second branch electrodes 602 extends from one side of the vertical electrode 612 in the second domain B diagonally with respect to the one side of the vertical electrode 612.

The third branch electrode 603 may include a plurality of branch electrodes in the third domain C, and the plurality of third branch electrodes 603 are aligned in parallel to one another. In such an embodiment, at least one of the third branch electrodes 603 extends from one side of the horizontal electrode 611 in the third domain C diagonally with respect to the one side of the horizontal electrode 611. The remainder of third branch electrodes 603 extends from one side of the vertical electrode 612 in the third domain C diagonally with respect to the one side of the vertical electrode 612.

The fourth branch electrode 604 may include a plurality of branch electrodes in the fourth domain D, and the plurality of fourth branch electrodes 604 are aligned in parallel to one another. In such an embodiment, at least one of the fourth branch electrodes 604 extends from one side of the horizontal electrode 611 in the fourth domain D diagonally with respect to the one side of the horizontal electrode 611. The remainder of fourth branch electrodes 604 extends from one side of the vertical electrode 612 in the fourth domain D diagonally with respect to the one side of the vertical electrode 612.

The bridge electrode 603 extends from the stem electrode 613 to be connected to the connection electrode 503, and to the drain electrode DE of the thin film transistor TFT.

The second pixel electrode PE2 overlaps the first pixel electrode PE1. In one exemplary embodiment, for example, the first branch electrode 601a of the second pixel electrode PE2 may overlap the first electrode 501a of the first pixel electrode PE1, the second branch electrode 601b of the second pixel electrode PE2 may overlap the second electrode 501b of the first pixel electrode PE1, the third branch electrode 601c of the second pixel electrode PE2 may overlap the first electrode 502a of the first pixel electrode PE1, and the fourth branch electrode 601d of the second pixel electrode PE2 may overlap the second electrode 502b of the first pixel electrode PE1. In such an embodiment, the vertical electrode 612 of the second pixel electrode PE2 may overlap the linear electrode 500, the first planar electrode 501 and the second planar electrode 502 of the first pixel electrode PE1.

The third pixel electrode PE3, as illustrated in FIGS. 8 and 10, includes a plurality of floating electrodes 701, 702 and 703 that are spaced apart from one another. In one exemplary embodiment, for example, the third pixel electrode PE3 may include first, second and third floating electrodes 701, 702 and 703.

The first floating electrode 701 includes a stem electrode 711 and branch electrodes 701a and 701b.

The stem electrode 711 of the first floating electrode 701 is disposed around respective edges of the first domain A and the second domain B near a boundary line of the pixel region P. The stem electrode 711, as illustrated in FIGS. 8 and 10, may have an inverted U-like shape.

The branch electrodes 701a and 701b of the first floating electrode 701 include at least one first branch electrode 701a and at least one second branch electrode 701b extending from the stem electrode 711 in different directions from one another. In other words, the first and the second branch electrodes 701a and 701b extend from the stem electrode 711 onto the first and second domains A and B, respectively. In one exemplary embodiment, for example, the first branch electrode 701a extends onto the first domain A, and the second branch electrode 701b extends onto the second domain B.

The first branch electrode 701a of the first floating electrode 701 extends in parallel to at least one of the first branch electrodes 601a of the second pixel electrode PE2, and the second branch electrode 701b of the first floating electrode 701 extends in parallel to at least one of the second branch electrodes 601b of the second pixel electrode PE2.

At least one of the first branch electrodes 701a and at least one of the second branch electrodes 701b of the first floating electrode 701 may be connected to one another.

The first branch electrode 701a and the second branch electrode 701b of the first floating electrode 701 overlap the first planar electrode 501 of the first pixel electrode PE1. In one exemplary embodiment, for example, the first branch electrode 701a may overlap the first electrode 501a of the first planer electrode 501, and the second branch electrode 701b may overlap the second electrode 501b of the first planar electrode 501.

The second floating electrode 702 includes a stem electrode 712 and a branch electrode 701c.

The stem electrode 712 of the second floating electrode 702 is disposed around an edge of the third domain C near the boundary line of the pixel region P. The stem electrode 712, as illustrated in FIGS. 8 and 10, may have an L-like shape.

The branch electrode 701c of the second floating electrode 702 is disposed in the third domain C.

The branch electrode 701c of the second floating electrode 702 extends in parallel to at least one of the third branch electrodes 601c of the second pixel electrode PE2.

The branch electrode 701c of the second floating electrode 702 overlaps the second planar electrode 502 of the first pixel electrode PE1. In one exemplary embodiment, for example, the branch electrode 701c may overlap the first electrode 502a of the second planar electrode 502.

The third floating electrode 703 includes a stem electrode 713 and a branch electrode 701d.

The stem electrode 713 is disposed around an edge of the fourth domain D near the boundary line of the pixel region P. The stem electrode 713, as illustrated in FIGS. 8 and 10, may have a shape symmetrical to that of the stem electrode 712 of the second floating electrode 702 with respect to the vertical electrode 612.

The branch electrode 701d of the third floating electrode 703 is disposed in the fourth domain D.

The branch electrode 701d of the third floating electrode 703 extends to be parallel to at least one of the fourth branch electrodes 601d of the second pixel electrode PE2.

The branch electrode 701d of the third floating electrode 703 overlaps the second planar electrode 502 of the first pixel electrode PH. In one exemplary embodiment, for example, the branch electrode 701d may overlap the second electrode 502b of the second planar electrode 502.

The second substrate 302 may use an insulating substrate including or formed of glass or plastic, for example.

The light shielding layer 376 is disposed on the second substrate 302. The light shielding layer 376 is disposed over the second substrate 302 and exposes the pixel region P and the data line DL. The light shielding layer 376 may reduce or effectively prevent light leakage from the remaining portion of the second substrate 302.

The overcoat layer 370 is disposed on the light shielding layer 376. In such an embodiment, the overcoat layer 370 may be disposed over an entire surface of the second substrate 302 including the light shielding layer 376.

The common electrode 330 is disposed on the overcoat layer 370. In such an embodiment, the common electrode 330 may be disposed over an entire surface of the second substrate 302 including the overcoat layer 370.

Each of the first, second, third and fourth domains A, B, C and D provided in the above-described manner includes a plurality of sub-domains, and the magnitude or direction of an electric field in each of the sub-domains differs from one another. Such electric fields in the sub-domains will hereinafter be described in detail with reference to FIGS. 4 and 11.

Figure 11:
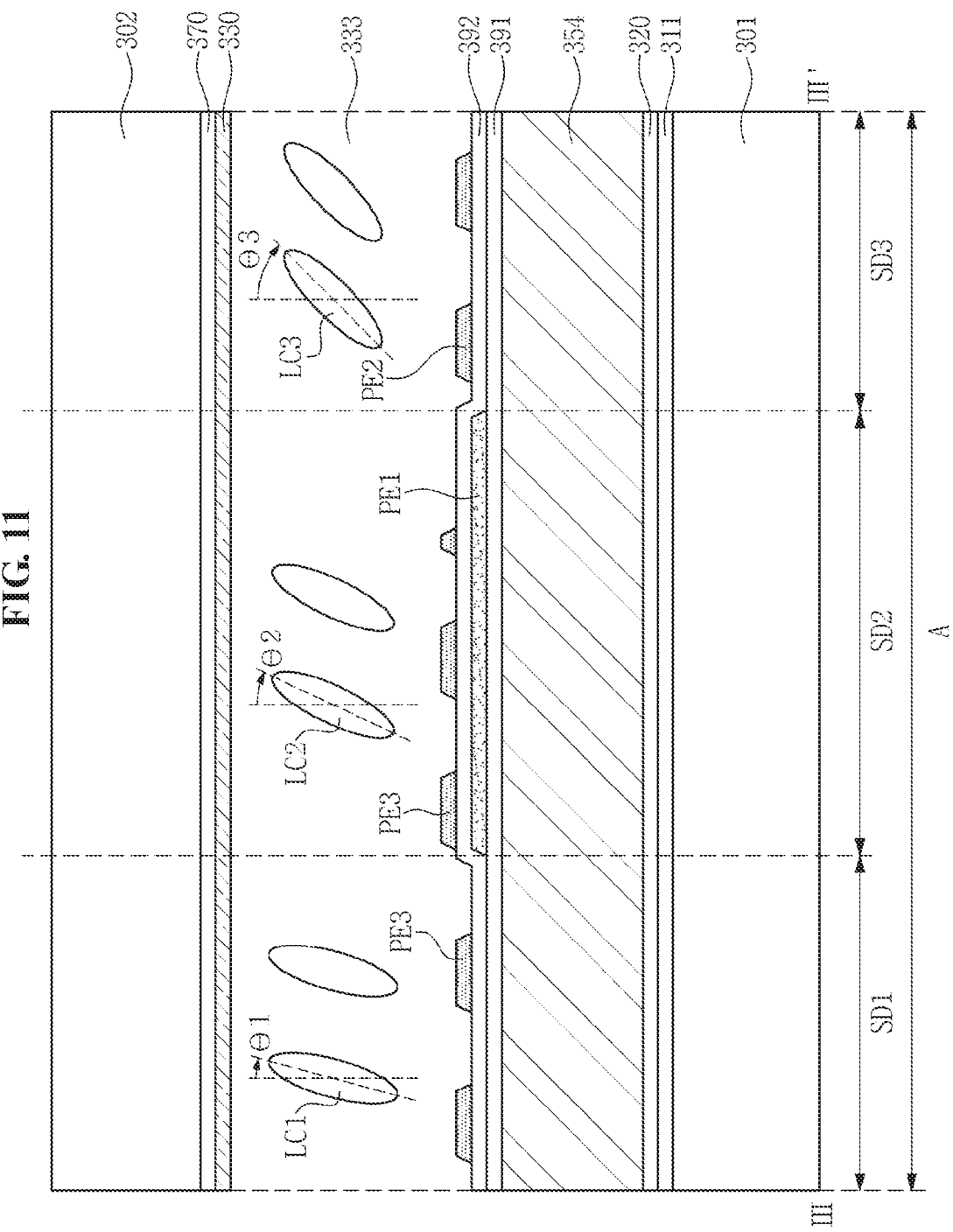
FIG. 11 is a cross-sectional view taken along line of FIG. 4.

FIG. 11 is a cross-sectional view taken along line of FIG. 4.

As illustrated in FIG. 11, the first domain A may include first, second, and third sub-domains SD1, SD2, and SD3. The first sub-domain SD1 includes a liquid crystal layer 333 controlled by an electric field between the third pixel electrode PE3 and the common electrode 330, the second sub-domain SD2 includes a liquid crystal layer 333 controlled by an electric field between the third pixel electrode PE3 overlapping the first pixel electrode PE1 and the common electrode 330, and the third sub-domain SD3 includes a liquid crystal layer 333 controlled by an electric field between the second pixel electrode PE2 and the common electrode 330. The liquid crystal layer 333 includes liquid crystal molecules LC1, LC2 and LC3 in the first, second and third sub-domains SD1, SD2 and SD3, respectively. The liquid crystal molecules LC1, LC2, and LC3, as illustrated in FIG. 11, may be vertically aligned liquid crystal molecules having a negative dielectric constant.

In an exemplary embodiment, when an image data signal is applied to the first pixel electrode PE1 and the second pixel electrode PE2 through the thin film transistor TFT, electric fields being applied to the liquid crystal molecules LC1, LC2 and LC3 in the first, second and third sub-domains SD1, SD2 and SD3, respectively, have different sizes or magnitudes from one another. In such an embodiment, the electric field of the first sub-domain SD1 is the smallest, and the electric field of the third sub-domain SD3 is the greatest. The electric field of the second sub-domain SD2 is greater than that of first sub-domain SD1 and is smaller than that of the third sub-domain SD3. Accordingly, the liquid crystal molecule LC1 of the first sub-domain SD1 is tilted at a smallest angle, e.g., a first angle $\theta1$, and the liquid crystal molecule LC3 of the third sub-domain SD3 is tilted at a greatest angle, e.g., a third angle θ3. The liquid crystal molecule LC2 of the second sub-domain SD2 is tilted at an angle, e.g., a second angle θ2, which is greater than the first angle θ1 at which the liquid crystal molecule LC1 of the first sub-domain SD1 is tilted and is smaller than the third angle θ3 at which the liquid crystal molecule LC2 of the second sub-domain SD2 is tilted.

In the same manner as in the first domain A, each of the second, third and fourth domains B, C and D includes first, second and third sub-domains SD1, SD2 and SD3. Respective electric fields of the first, second and third sub-domains SD1, SD2 and SD3 included in each of the second, third and fourth domains B, C, and D have substantially the same sizes as the respective electric fields of the first, second and third sub-domains SD1, SD2, and SD3 in the first domain A.

Figure 12:
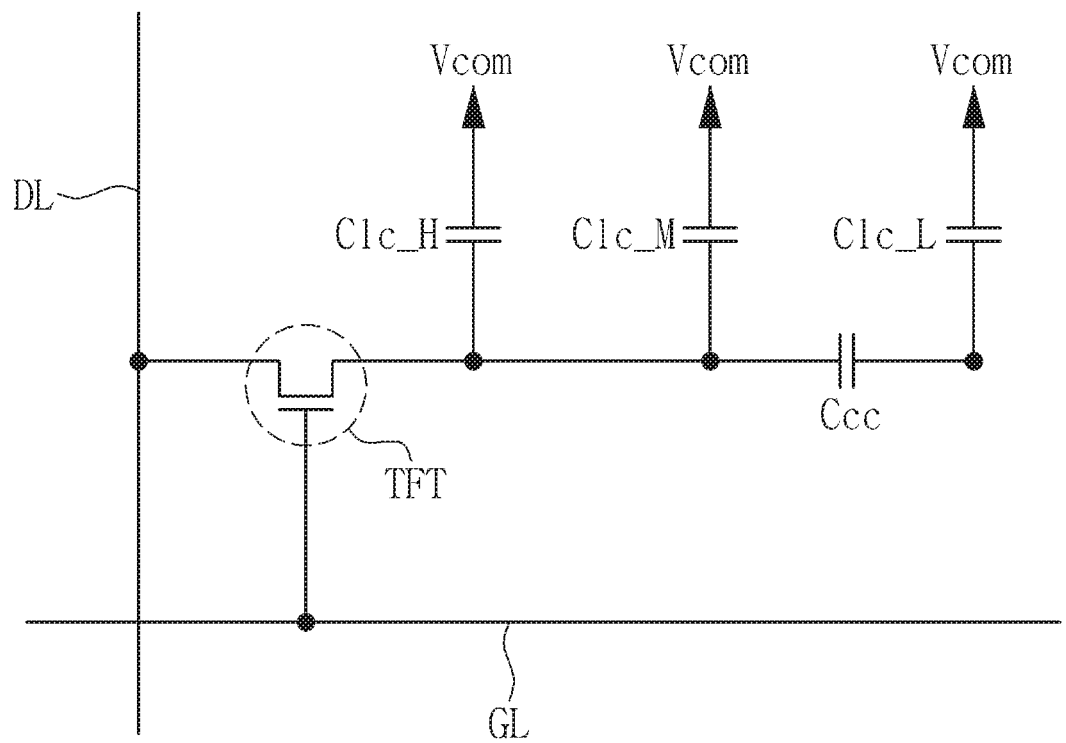
FIG. 12 is an equivalent circuit view of the pixel of FIG. 4.

FIG. 12 is an equivalent circuit view of the pixel of FIG. 4.

In an exemplary embodiment, the pixel, as illustrated in FIG. 12, includes the thin film transistor TFT, a first liquid crystal capacitor Clc_L, a second liquid crystal capacitor Clc_M, a third liquid crystal capacitor Clc_H, and a coupling capacitor Ccc.

The drain electrode DE of the thin film transistor TFT is connected to the first pixel electrode PE1 and the second pixel electrode PE2.

The first liquid crystal capacitor Clc_L is connected between the first pixel electrode PE1 and the common electrode 330.

The second liquid crystal capacitor Clc_M is connected between the third pixel electrode PE3 overlapping the first pixel electrode PE1 and the common electrode 330.

The third liquid crystal capacitor Clc_H is connected between the third pixel electrode PE3 and the common electrode 330.

The coupling capacitor Ccc is connected between the first pixel electrode PE1 and the third pixel electrode PE3.

Each of the pixels of FIG. 1 may have the same structure as that illustrated in FIGS. 4 to 10.

Figure 13:
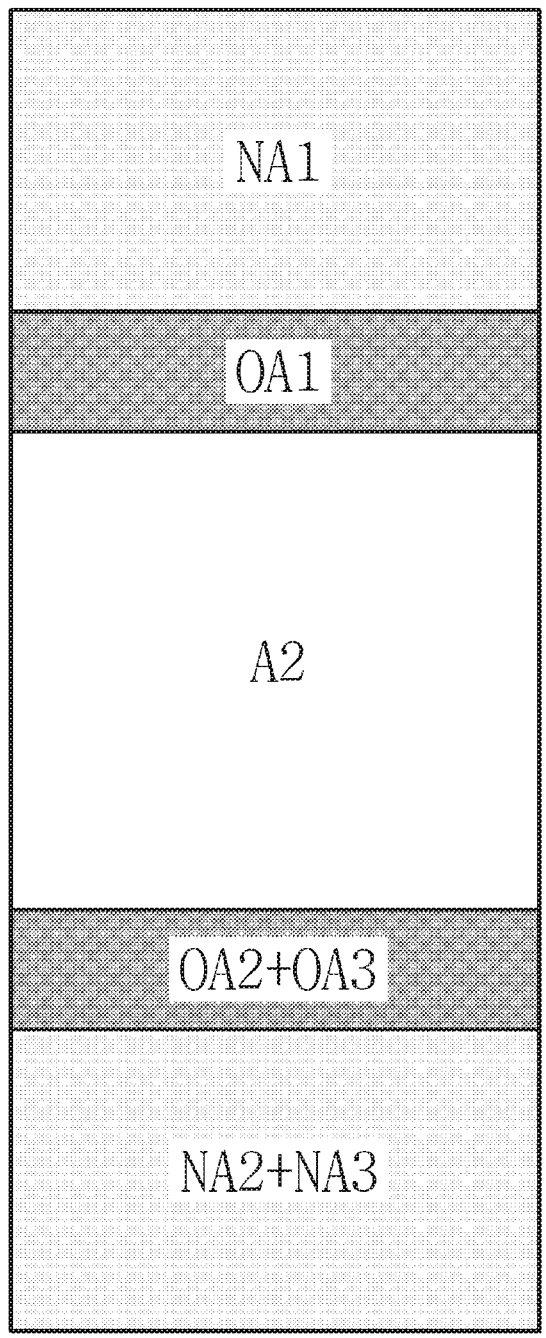
FIG. 13 is a schematic view illustrating respective planar areas of the first pixel electrode, the second pixel electrode, and the third pixel electrode included in the pixel of FIG. 4.

FIG. 13 is a schematic view illustrating respective planar areas of the first pixel electrode PE1, the second pixel electrode PE2, and the third pixel electrode PE3 in the pixel of FIG. 4.

A planar area of a portion of the first floating electrode 701 that overlaps the first pixel electrode PE1 (or a planar area of a portion of the first pixel electrode PE1 that overlaps the first floating electrode 701) is defined as a first overlapping area OA1, a planar area of a portion of the second floating electrode 702 that overlaps the first pixel electrode PE1 (or a planar area of a portion of the first pixel electrode PE1 that overlaps the second floating electrode 702) is defined as a second overlapping area OA2, and a planar area of a portion of the third floating electrode 703 that overlaps the first pixel electrode PE1 (or a planar area of a portion of the first pixel electrode PE1 that overlaps the third floating electrode 703) is defined as a third overlapping area OA3.

A planar area of a portion of the first floating electrode 701 other than the first overlapping area OA1 is defined as a first non-overlapping area NA1, a planar area of a portion of the second floating electrode 702 other than the second overlapping area OA2 is defined as a second non-overlapping area NA2, and a planar area of a portion of the third floating electrode 703 other than the third overlapping area OA3 is defined as a third non-overlapping area NA3.

In an exemplary embodiment of the pixel illustrated in FIG. 4, the first non-overlapping area NA1 is the same as a sum of the second non-overlapping area NA2 and the third non-overlapping area NA3. In such an embodiment, the first overlapping area OA1 is the same as a sum of the second overlapping area OA2 and the third overlapping area OA3.

Accordingly, in the pixel illustrated in FIG. 4, a sum of a luminance of the first sub-domain SD1 included in the first domain A and a luminance of the second sub-domain SD2 included in the second domain B is substantially the same as a sum of a luminance of the first sub-domain SD1 included in the third domain C and a luminance of the first sub-domain SD1 included in the fourth domain D.

"A2" in FIG. 13 indicates a planar area of the second pixel electrode PE2. In such an embodiment, the planar area of the second pixel electrode PE2 corresponds to a planar area of a portion of the second pixel electrode PE2 in the pixel region P.

In an exemplary embodiment of the pixel of FIG. 4, the first pixel electrode PE1 has a planar area one to one third times a total planar area acquired by summing the planar area of the second pixel electrode PE2 and a planar area of the third pixel electrode PE3. In such an embodiment, when the planar area of the first pixel electrode PE1 is defined as a value of 1, the sum of the planar area of the second pixel electrode PE2 and the planar area of the third pixel electrode PE3 may be in a range of about 1 to about 3.

In one exemplary embodiment, for example, when the planar area of the first pixel electrode PE1 is defined as a value of 1, the sum of the planar area of the second pixel electrode PE2 and the planar area of the third pixel electrode PE3 may be in a range of about 1.5 to about 2.5. In such an embodiment, when a voltage applied to the first pixel electrode PE1 is defined as a value of 1, a sum of a voltage applied to the second pixel electrode PE2 and a voltage applied to the third pixel electrode PE3 may be in a range of about 0.75 to about 0.88.

Figure 14:
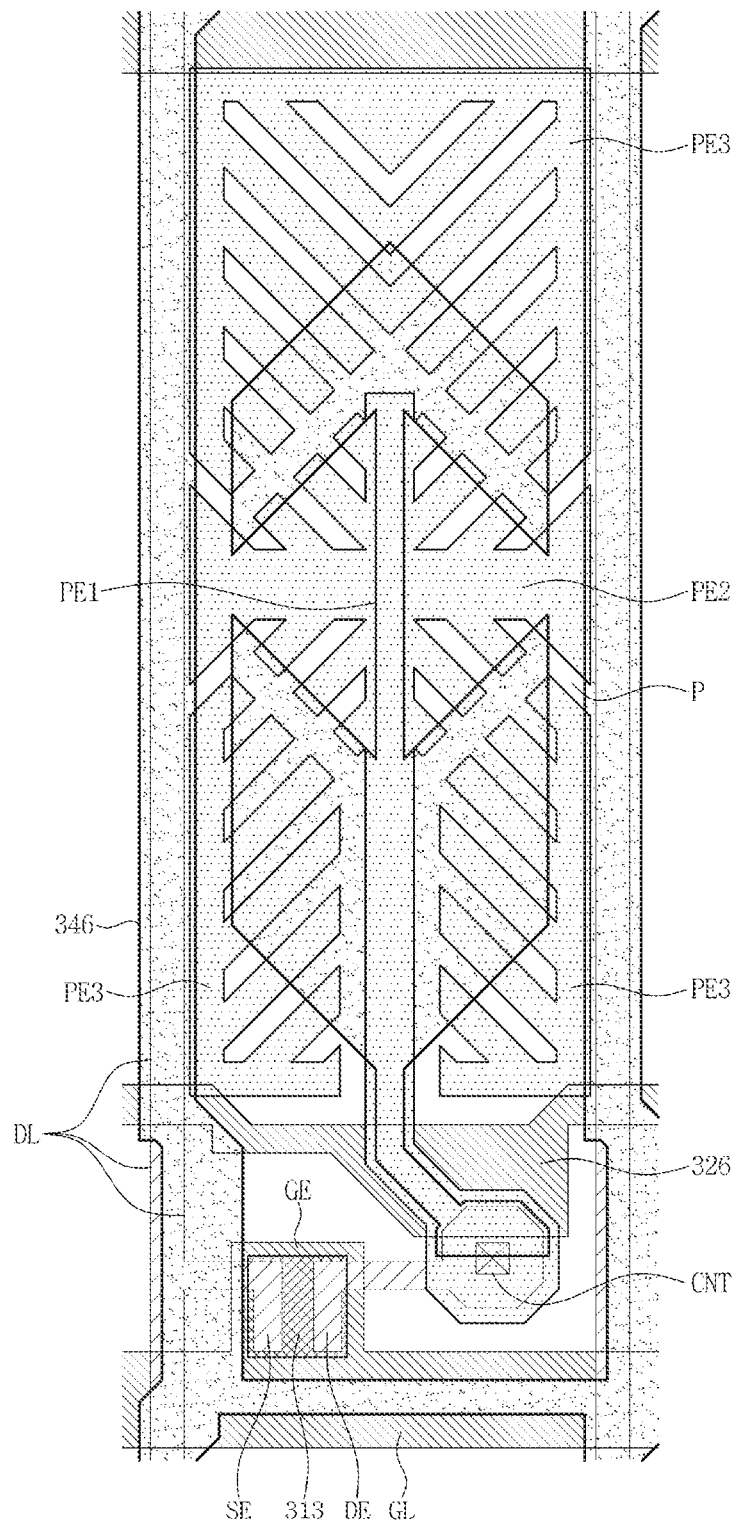
FIG. 14 is a plan view illustrating an alternative exemplary embodiment of a pixel illustrated in FIG. 3.
Figure 15:
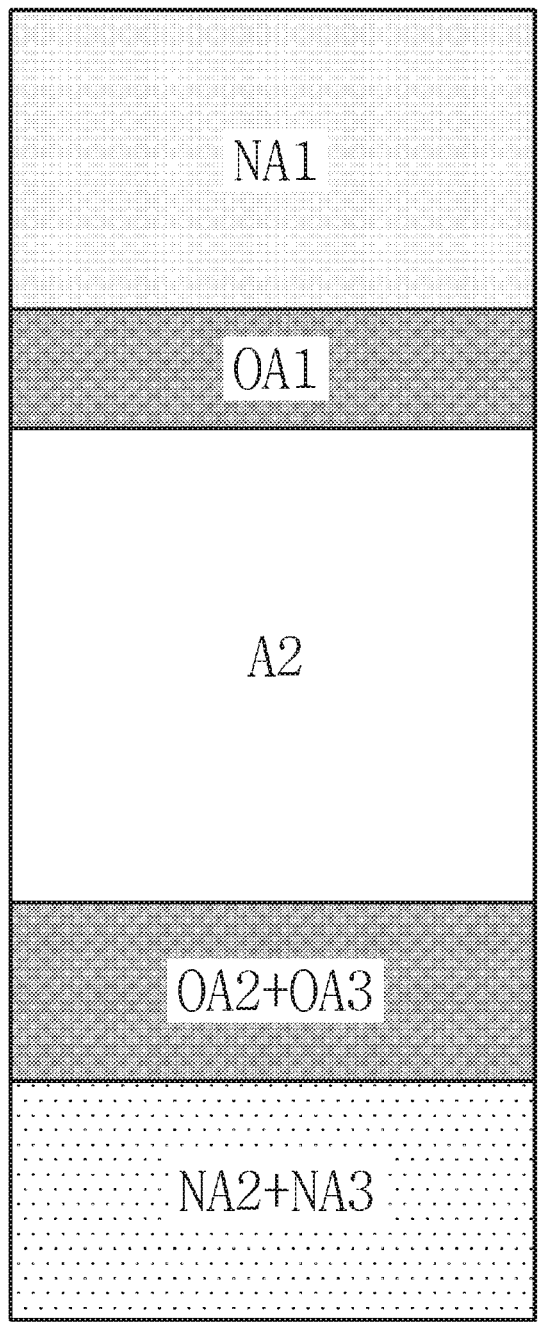
FIG. 15 is a schematic view illustrating respective planar areas of a first pixel electrode, a second pixel electrode, and a third pixel electrode included in the pixel of FIG. 14.

FIG. 14 is a plan view illustrating an alternative exemplary embodiment of a pixel illustrated in FIG. 3. FIG. 15 is a schematic view illustrating respective planar areas of a first pixel electrode PE1, a second pixel electrode PE2, and a third pixel electrode PE3 included in the pixel of FIG. 14.

The pixel (hereinafter, a second pixel) illustrated in FIG. 14 has the same structure as that of the pixel (hereinafter, a first pixel) illustrated in FIGS. 4 to 12. In an alternative exemplary embodiment, as in the second pixel, a first non-overlapping area NA1 may be different from a sum of a second non-overlapping area NA2 and a third non-overlapping area NA3. In such an embodiment, a first overlapping area OA1 may be different from a sum of a second overlapping area OA2 and a third overlapping area OA3. In such an embodiment, as illustrated in FIG. 15, the first non-overlapping area NA1 may be greater than the sum of the second non-overlapping area NA2 and the third non-overlapping area NA3. In such an embodiment, the first overlapping area OA1 may be smaller than the sum of the second overlapping area OA2 and the third overlapping area OA3.

Accordingly, in an exemplary embodiment of the second pixel, a sum of a luminance of a first sub-domain SD1 included in a first domain A and a luminance of a first sub-domain SD1 included in a second domain B is smaller than a sum of a luminance of a first sub-domain SD1 included in a third domain C and a luminance of a first sub-domain SD1 included in a fourth domain D. Thus, the second pixel may display a wide range of luminance as compared to a range of luminance displayed by the pixel illustrated in FIGS. 4 to 12, thereby achieving visibility relatively efficiently.

In such embodiment of the second pixel, when a planar area of the first pixel electrode PE1 is defined as a value of 1, a sum of a planar area of a first planar electrode 501 and a planar area of a first floating electrode 701 may be in a range of about 1 to about 2. In addition, in the second pixel, when the planar area of the first pixel electrode PE1 is defined as a value of 1, a sum of a planar area of a second planar electrode 502, a planar area of a second floating electrode 702, and a planar area of a third floating electrode 703 may be in a range of about 1 to about 2.

Figure 16:
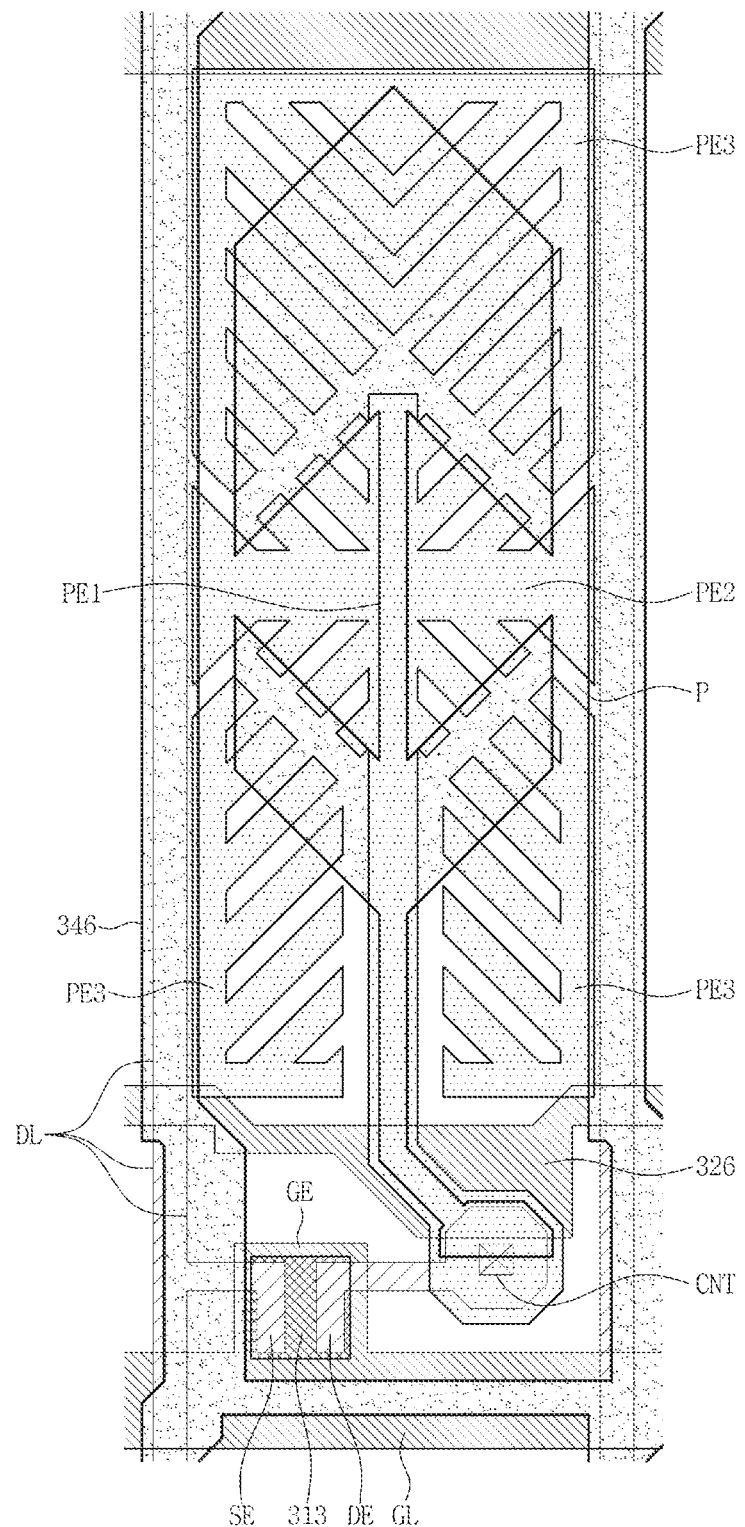
FIG. 16 is a plan view illustrating another alternative exemplary embodiment of a pixel illustrated in FIG. 3.
Figure 17:
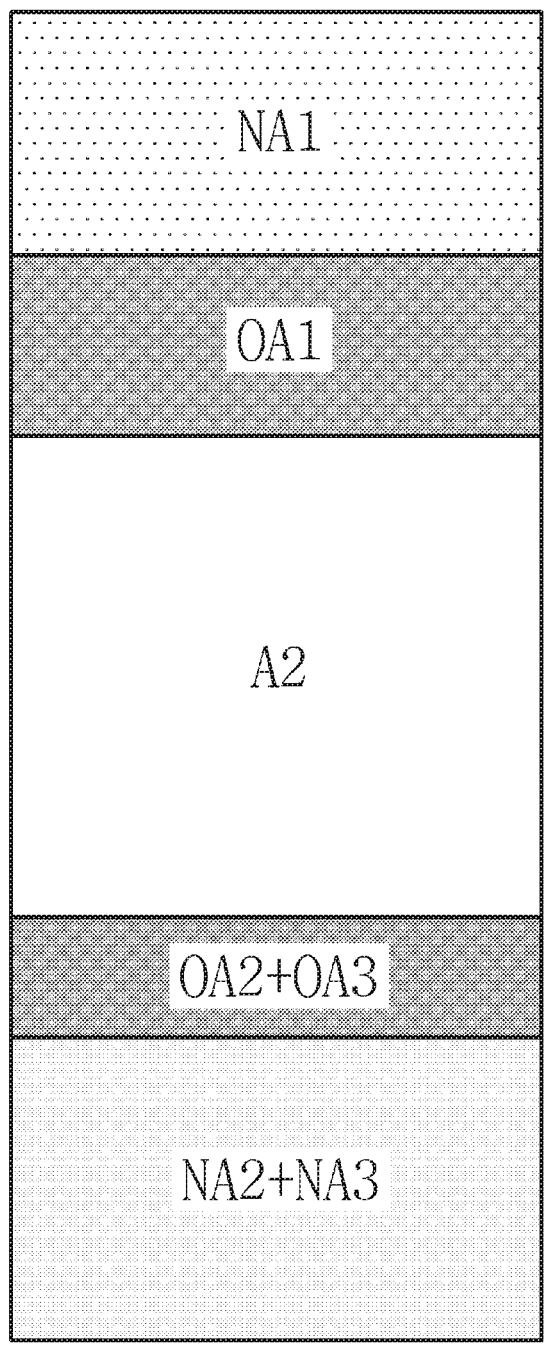
FIG. 17 is a schematic view illustrating respective planar areas of a first pixel electrode, a second pixel electrode, and a third pixel electrode included in the pixel of FIG. 16.

FIG. 16 is a plan view illustrating still another alternative exemplary embodiment of a pixel illustrated in FIG. 3. FIG. 17 is a schematic view illustrating respective planar areas of a first pixel electrode PE1, a second pixel electrode PE2, and a third pixel electrode PE3 included in the pixel of FIG. 16.

The pixel (hereinafter, a third pixel) illustrated in FIG. 16 has the same structure as that of the first pixel described hereinabove. However, in an alternative exemplary embodiment of the third pixel, a first non-overlapping area NA1 may be different from a sum of a second non-overlapping area NA2 and a third non-overlapping area NA3. In such an embodiment, a first overlapping area OA1 is different from a sum of a second overlapping area OA2 and a third overlapping area OA3. In such an embodiment, as illustrated in FIG. 17, the first non-overlapping area NA1 is smaller than the sum of the second non-overlapping area NA2 and the third non-overlapping area NA3. In such an embodiment, the first overlapping area OA1 is greater than the sum of the second overlapping area OA2 and the third overlapping area OA3.

Accordingly, in another alternative exemplary embodiment of the third pixel, a sum of a luminance of a first sub-domain SD1 included in a first domain A and a luminance of a first sub-domain SD1 included in a second domain B may be greater than a sum of a luminance of a first sub-domain SD1 included in a third domain C and a luminance of a first sub-domain SD1 included in a fourth domain D. Thus, in such an embodiment, the third pixel may display a wider range of luminance as compared to a range of luminance displayed by the pixel illustrated in FIGS. 4 to 12, thereby achieving visibility relatively efficiently.

In such an embodiment of the third pixel, when a planar area of the first pixel electrode PE1 is defined as a value of 1, a sum of a planar area of a first planar electrode 501 and a planar area of a first floating electrode 701 may be in a range of about 1 to about 2. In addition, in the third pixel, when the planar area of the first pixel electrode PE1 is defined as a value of 1, a sum of a planar area of a second planar electrode 502, a planar area of a second floating electrode 702, and a planar area of a third floating electrode 703 may be in a range of about 1 to about 2.

In an exemplary embodiment, the display panel 100 may include second and third pixels in lieu of the first pixel. In one exemplary embodiment, for example, among the pixels illustrated in FIG. 3, each of pixels connected to odd-numbered data lines DL1, DL3, DL5, . . . , DLj−1 may have the same structure as the structure of the second pixel, and each of pixels connected to even-numbered data lines DL2, DL4, DL6, . . . , DLj may have the same structure as the structure of the third pixel.

Figure 18:
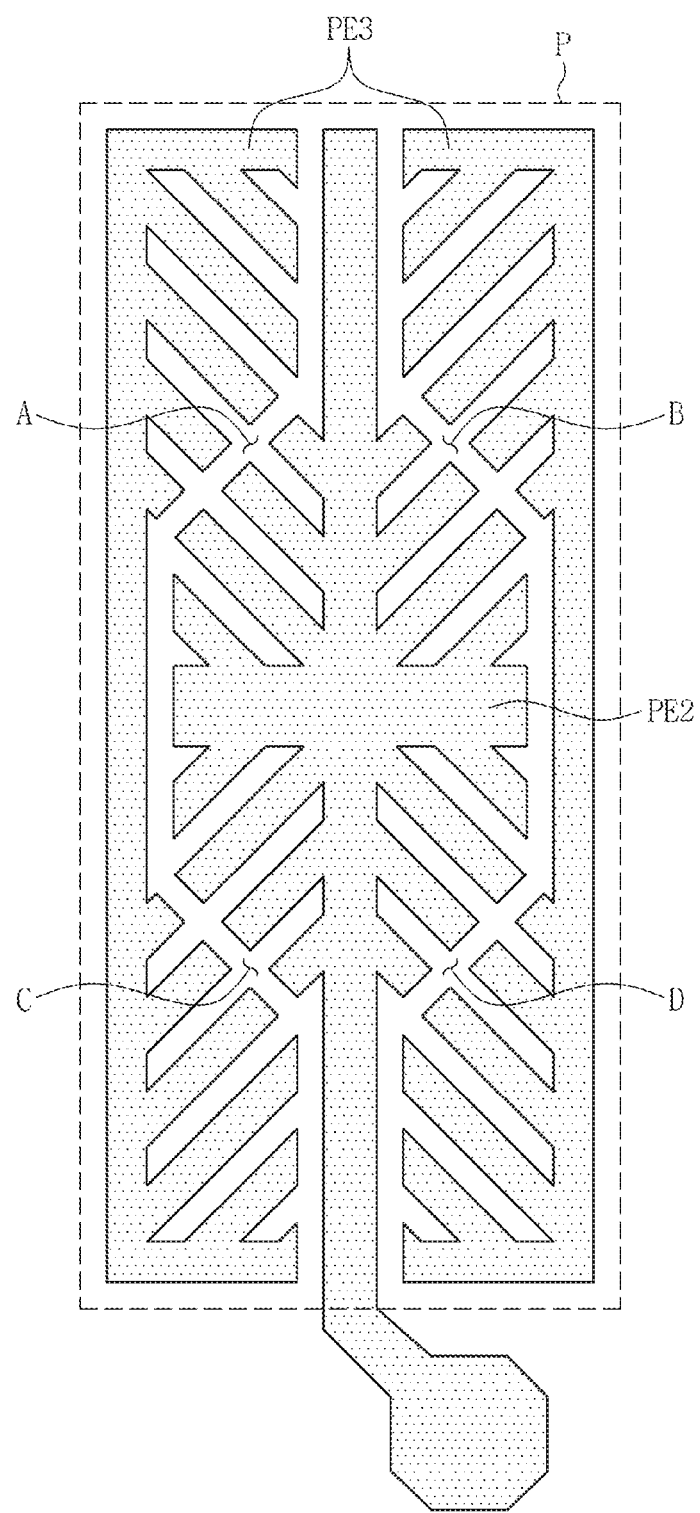
FIG. 18 is a view illustrating another structure of a second pixel electrode and a third pixel electrode.
Figure 19:
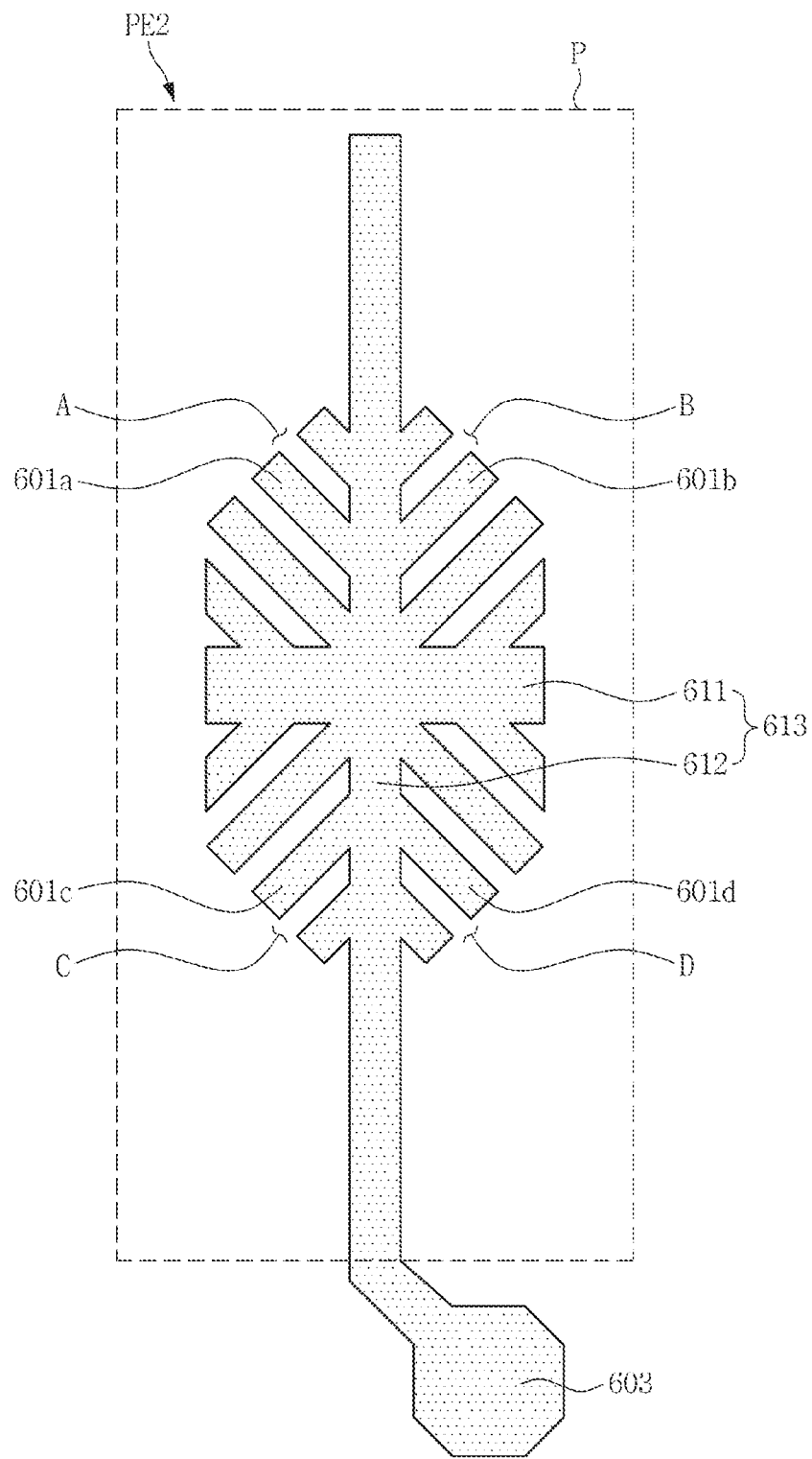
FIG. 19 is a view illustrating a second pixel electrode of FIG. 18.
Figure 20:
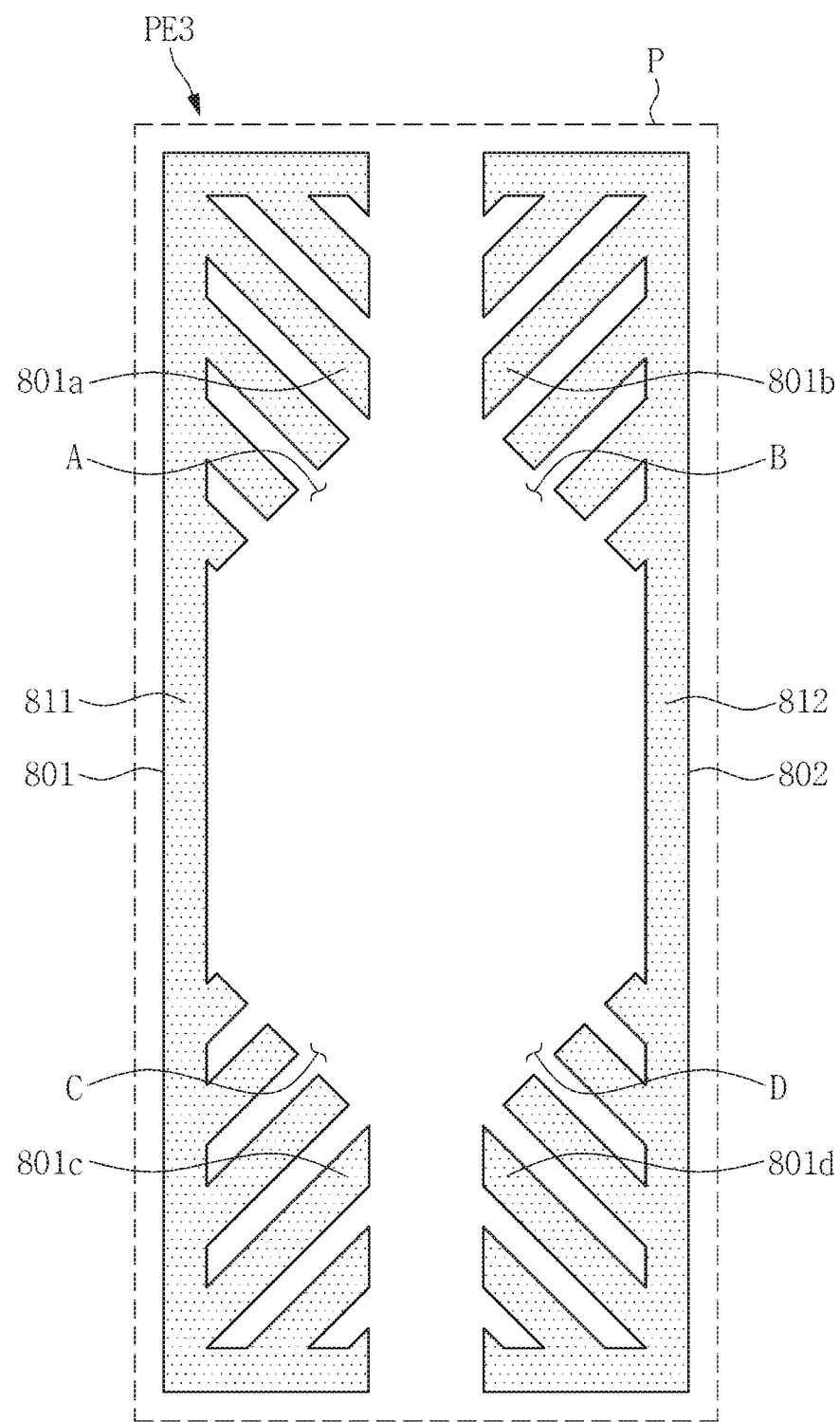
FIG. 20 is a view illustrating a third pixel electrode of FIG. 18.

FIG. 18 is a view illustrating another structure of a second pixel electrode PE2 and a third pixel electrode PE3. FIG. 19 is a view illustrating a second pixel electrode PE2 of FIG. 18. FIG. 20 is a view illustrating a third pixel electrode PE3 of FIG. 18.

The second pixel electrode PE2, as illustrated in FIGS. 18 and 19, includes a stem electrode 613, a plurality of branch electrodes 601a, 601b, 601c and 601d, and a bridge electrode 603.

The stem electrode 613, the plurality of branch electrodes 601a, 601b, 601c and 601d, and the bridge electrode 603 included in the second pixel electrode PE2 of FIGS. 18 and 19 are substantially the same as the stem electrode 613, the plurality of branch electrodes 601a, 601b, 601c and 601d, and the bridge electrode 603 included in the second pixel electrode PE2 of FIGS. 8 and 9. Thus, a detailed description on the second pixel electrode PE2 of FIGS. 18 and 19 will make reference to analogous features provided in FIGS. 8 and 9, and a related description.

In an exemplary embodiment, the third pixel electrode PE3, as illustrated in FIGS. 18 and 20, includes a first floating electrode 801 and a second floating electrode 802.

The first floating electrode 801 includes a stem electrode 811 and a plurality of branch electrodes 801a and 801c.

The stem electrode 811 of the first floating electrode 801 is disposed around respective edges of a first domain A and a third domain C near a boundary line of the pixel region P. The stem electrode 811, as illustrated in FIGS. 18 and 20, may have a C-like shape.

In an exemplary embodiment, the branch electrodes 801a and 801c of the first floating electrode 801 include a first branch electrode 801a and a second branch electrode 801c extending from the stem electrode 811 in different directions from one another. In such an embodiment, the first and the second branch electrodes 801a and 801c extend from the stem electrode 811 onto the first and third domains A and C, respectively. In one exemplary embodiment, for example, the first branch electrode 801a extends onto the first domain A, and the second branch electrode 801c extends onto the third domain C.

The first branch electrode 801a of the first floating electrode 801 extends in parallel to at least one of the first branch electrodes 601a of the second pixel electrode PE2, and the second branch electrode 801c of the first floating electrode 801 extends in parallel to at least one of the third branch electrodes 601c of the second pixel electrode PE2.

The first branch electrode 801a and the second branch electrode 801c of the first floating electrode 801 overlap a first planar electrode 501 and a second planar electrode 502 of the first pixel electrode PE1, respectively. In one exemplary embodiment, for example, the first branch electrode 801a may overlap a first electrode 501a of the first planer electrode 501, and the second branch electrode 801c may overlap a first electrode 502a of the second planar electrode 502, respectively.

The second floating electrode 802 may have a shape symmetrical to that of the first floating electrode 801 with respect to a vertical electrode 612.

The second floating electrode 802 includes a stem electrode 812 and a plurality of branch electrodes 801b and 801d.

The stem electrode 812 of the second floating electrode 802 is disposed around respective edges of a second domain B and a fourth domain D near a boundary line of the pixel region P. The stem electrode 812 of the second floating electrode 802, as illustrated in FIGS. 18 and 20, have a shape symmetrical to that of the stem electrode 811 of the first floating electrode 801 with respect to the vertical electrode 612.

The branch electrodes 801b and 801d of the second floating electrode 802 include a first branch electrode 801b and a second branch electrode 801d extending from the stem electrode 812 in different directions from one another. In such an embodiment, the first and the second branch electrodes 801b and 801d extend from the stem electrode 812 onto the second and fourth domains B and D, respectively.

In one exemplary embodiment, for example, the first branch electrode 801b extends onto the second domain B, and the second branch electrode 801d extends onto the fourth domain D.

The first branch electrode 801b of the second floating electrode 802 extends in parallel to at least one of the second branch electrodes 601b of the second pixel electrode PE2, and the second branch electrode 801d of the second floating electrode 802 extends in parallel to at least one of the fourth branch electrodes 601d of the second pixel electrode PE2.

The first branch electrode 801b and the second branch electrode 801d of the second floating electrode 802 overlap the first planar electrode 501 and the second planar electrode 502 of the first pixel electrode PE1, respectively. In one exemplary embodiment, for example, the first branch electrode 801b may overlap a second electrode 501b of the first planer electrode 501, and the second branch electrode 801d may overlap a second electrode 502b of the second planar electrode 502, respectively.

As set forth above, according to one or more exemplary embodiments of the invention, the respective electric fields of the sub-domains are differently controlled by the first, second and third pixel electrodes such that the visibility of the LCD device may be enhanced.

In such embodiments, the first pixel electrode and the third pixel electrode, which overlap one another and generate a medium-sized electric field, include or are formed of a transparent material such that the aperture ratio of the LCD device may be enhanced.

From the foregoing, it will be appreciated that various embodiments in accordance with the disclosure have been described herein for purposes of illustration, and that various modifications may be made without departing from the scope and spirit of the teachings. Accordingly, the various embodiments disclosed herein are not intended to be limiting of the true scope and spirit of the teachings. Various features of the above described and other embodiments can be mixed and matched in any manner, to produce further embodiments consistent with the invention.

What is claimed is:

1. A liquid crystal display device comprising:
    a first substrate;
    a second substrate opposing the first substrate; and
    a plurality of pixels on the first substrate,
    wherein at least one pixel comprises:
        a switching element connected to a gate line and a data line on the first substrate;
        a first pixel electrode connected to the switching element;
        a second pixel electrode connected to the switching element and overlapping the first pixel electrode,
        a third pixel electrode overlapping the first pixel electrode, and
        the third pixel electrode is a floating electrode.

2. The liquid crystal display device of claim 1, wherein each of the first, second and third pixel electrodes comprises a transparent material.

3. The liquid crystal display device of claim 1, wherein the at least one pixel includes first and second pixels, an overlapping area between the first pixel electrode and the third pixel electrode of the first pixel differs from an overlapping area between a first pixel electrode and a third pixel electrode in the second pixel.

4. The liquid crystal display device of claim 3, wherein the first pixel and the second pixel are connected to different data lines from one another.

5. The liquid crystal display device of claim 4, wherein the first pixel is connected to an odd-numbered data line, and
    the second pixel is connected to an even-numbered data line.

6. The liquid crystal display device of claim 1, wherein the first pixel electrode has a planar area, a ratio of which to a total planar area acquired by summing a planar area of the second pixel electrode and a planar area of the third pixel electrode is in a range of about 1/3 to about 1.

7. The liquid crystal display device of claim 1, wherein the third pixel electrode and the second pixel electrode are disposed in a same layer.

8. The liquid crystal display device of claim 1, wherein the first pixel electrode comprises:
    a linear electrode parallel to the data line;
    a first planar electrode at an end of the linear electrode;
    a second planar electrode at another end of the linear electrode; and
    a connection electrode extending from the second planar electrode to be connected to the switching element.

9. The liquid crystal display device of claim 8, wherein the first planar electrode is linearly symmetrical to the second planar electrode.

10. The liquid crystal display device of claim 8, wherein at least one of the first planar electrode and the second planar electrode is symmetrical to the linear electrode.

11. The liquid crystal display device of claim 8, wherein the second pixel electrode comprises:
    a stem electrode overlapping the linear electrode, the first planar electrode and the second planar electrode;
    at least one branch electrode extending from the stem electrode; and
    a bridge electrode extending from the stem electrode to be connected to the connection electrode and to the switching element.

12. The liquid crystal display device of claim 11, wherein at least one of the branch electrodes of the second pixel electrode overlaps at least one of the first planar electrode and the second planar electrode.

13. The liquid crystal display device of claim 8, wherein the third pixel electrode comprises:
    a first floating electrode overlapping the first planar electrode;
    a second floating electrode overlapping a portion of the second planar electrode; and
    a third floating electrode overlapping another portion of the second planar electrode.

14. The liquid crystal display device of claim 13, wherein a portion of the first floating electrode does not overlap the first planar electrode.

15. The liquid crystal display device of claim 13, wherein a portion of at least one of the second floating electrode and the third floating electrode does not overlap the second planar electrode.

16. The liquid crystal display device of claim 13, wherein the first floating electrode comprises:
    a stem electrode;
    a first branch electrode extending from the stem electrode and overlapping a portion of the first planar electrode; and
    a second branch electrode extending from the stem electrode and overlapping another portion of the first planar electrode.

17. The liquid crystal display device of claim 13, wherein the second floating electrode comprises:
   a stem electrode; and
   a branch electrode extending from the stem electrode and overlapping the portion of the second planar electrode.

18. The liquid crystal display device of claim 13, wherein the third floating electrode comprises:
   a stem electrode; and
   a branch electrode extending from the stem electrode and overlapping the another portion of the second planar electrode.

19. The liquid crystal display device of claim 8, wherein the third pixel electrode comprises:
   a first floating electrode overlapping a portion of the first planar electrode and a portion of the second planar electrode; and
   a second floating electrode overlapping another portion of the first planar electrode and another portion of the second planar electrode.

* * * * *